United States Patent
Maghsoudi et al.

(10) Patent No.: US 12,424,896 B2
(45) Date of Patent: Sep. 23, 2025

(54) ELECTRIC MOTOR WITH INTEGRATED HEAT EXCHANGER

(71) Applicant: CALIFORNIA INSTITUTE OF TECHNOLOGY, Pasadena, CA (US)

(72) Inventors: Elham Maghsoudi, Pasadena, CA (US); Jay D. Jasper, Pasadena, CA (US); Benjamin I. Furst, Pasadena, CA (US); Scott N. Roberts, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 325 days.

(21) Appl. No.: 18/190,098

(22) Filed: Mar. 26, 2023

(65) Prior Publication Data

US 2023/0344301 A1    Oct. 26, 2023

Related U.S. Application Data

(60) Provisional application No. 63/323,614, filed on Mar. 25, 2022.

(51) Int. Cl.
| | |
|---|---|
| *H02K 5/20* | (2006.01) |
| *H02K 5/02* | (2006.01) |
| *H02K 15/14* | (2006.01) |

(52) U.S. Cl.
CPC ................ *H02K 5/20* (2013.01); *H02K 5/02* (2013.01); *H02K 15/14* (2013.01)

(58) Field of Classification Search
CPC ............ H02K 5/20; H02K 5/02; H02K 15/14; H02K 3/24; H02K 9/20; H02K 5/18; H02K 5/203
See application file for complete search history.

(56) References Cited

U.S. PATENT DOCUMENTS

| | | |
|---|---|---|
| 5,581,155 A | 12/1996 | Morozov et al. |
| 11,346,330 B1 | 5/2022 | Xu et al. |

(Continued)

FOREIGN PATENT DOCUMENTS

KR    20140145653 A    *  12/2014

OTHER PUBLICATIONS

KR20140145653A English translation (Year: 2025).*
(Continued)

*Primary Examiner* — Christopher M Koehler
*Assistant Examiner* — Viswanathan Subramanian
(74) *Attorney, Agent, or Firm* — Steinfl + Bruno LLP

(57) ABSTRACT

Systems and methods for integrating a heat exchanger in an electric motor (EM) system that includes a stator and a rotor are presented. An oscillating heat pipe (OHP) is provided within a housing of the EM system. The OHP includes channel segments with a sealed working fluid. According to another aspect, channel segments formed within a core of the stator communicate with the channel segments of the housing to provide an OHP. According to another aspect, the core of the stator includes an OHP. According to another aspect, the housing includes protruding structures with embedded channel segments. According to one aspect, the protruding structures include a plurality of fins. According to yet another aspect, the protruding structures are in contact with a fluid coolant that flows in a cavity of a structure coupled to the housing.

25 Claims, 19 Drawing Sheets

(56) References Cited

U.S. PATENT DOCUMENTS

| | | | |
|---|---|---|---|
| 12,078,153 | B2 | 9/2024 | Roberts et al. |
| 2006/0038450 | A1* | 2/2006 | Matin .................. H02K 9/225 |
| | | | 310/58 |
| 2007/0147002 | A1 | 6/2007 | Otsuki et al. |
| 2015/0128560 | A1 | 5/2015 | Conversano et al. |
| 2019/0326797 | A1* | 10/2019 | Tang ..................... H02K 5/18 |
| 2019/0350111 | A1* | 11/2019 | Bodla .................... F24S 10/95 |
| 2019/0366435 | A1 | 12/2019 | Firdosy et al. |
| 2021/0107664 | A1* | 4/2021 | Rabbi .................. H02K 9/225 |
| 2023/0003202 | A1 | 1/2023 | Roberts et al. |

OTHER PUBLICATIONS

Ayel et al., "Flat plate pulsating heat pipes: A review on the thermohydraulic principles, thermal performances and open issues," Applied Thermal Engineering, vol. 197, Oct. 2021, 117200. 37 pages.

Maghsoudi et al., "Thermal Characterization of an In-runner Double Row Planetary Actuator," Aerospace Thermal Control Workshop, Torrance, CA, Submitted on Jan. 2, 2020. 19 pages.

Jennifer Dooley, "Mission Concept for a Europa Lander," 2018 IEEE Aerospace Conference, Mar. 2018, Big Sky, MT, USA, DOI: 10.1109/AERO.2018.8396518, 10 pages.

Maghsoudi et al., "3D Printed Actuators with Innovative Integrated Thermal Management," Research Presentation Conference, 2020, 6 pages.

Maghsoudi et al., "Efficient Thermal Management for Sampling Arm Actuators," Published in Proceeding of 2020 International Conference on environmental Systems (ICES). 10 pages.

Georgiev et al., "Design and Analysis of the Bearingless Planetary Gearbox," 2017 IEEE/RSJ International Conference on Intelligent Robots and Systems (IROS), Sep. 24-28, 2017, Vancouver, BC, Canada, pp. 1987-1994.

Daimaru et al., "Comparison between Numerical Simulation and On-orbit Experiment of Oscillating Heat Pipes," International Journal of Heat and Mass Transfer, vol. 109, 2017, pp. 791-806.

Daimaru et al., "Study on thermal cycle in oscillating heat pipes by numerical analysis," Applied Thermal Engineering, vol. 113, 2017, pp. 1219-1227.

Drolen B. L. et al., "Performance Limits of Oscillating Heat Pipes: Theory and Validation" *Journal of Thermophysics and Heat Transfer*, Apr. 2017, pp. 1-17.

Ex Parte Quayle Action for U.S. Appl. No. 17/721,026, filed Apr. 14, 2022 on behalf of California Institute of Technology, Mail Date: May 2, 2024. 6 Pages.

Lev, D. et al., "The technological and commercial expansion of electric propulsion". *Acta Astronautica*. (Jun. 2019) 159: 213-227.

Mazouffre, S. "Electric propulsion for satellites and spacecraft: established technologies and novel approaches." *Plasma Sources Science and Technology*, 25.3 (2016): 033002.

Non-Final Office Action for U.S. Appl. No. 17/721,026, filed Apr. 14, 2022 on behalf of California Institute of Technology, Mail Date: Oct. 4, 2023. 24 pages.

Notice of Allowance for U.S. Appl. No. 17/721,026, filed Apr. 14, 2022 on behalf of California Institute of Technology. Mailed on Jun. 20, 2024. 7 pages.

Tong, B.Y. et al., "Closed Loop pulsating heat pipe", Applied Thermal Engineering 21 (2001), pp. 1845-1862.

Xian, Haizhen et al., "Heat Transfer Characteristics of Oscillating Heat Pipe With Water and Ethanol as Working Fluids", Journal of Heat Transfer, Dec. 2010, vol. 132, 6 pages.

\* cited by examiner

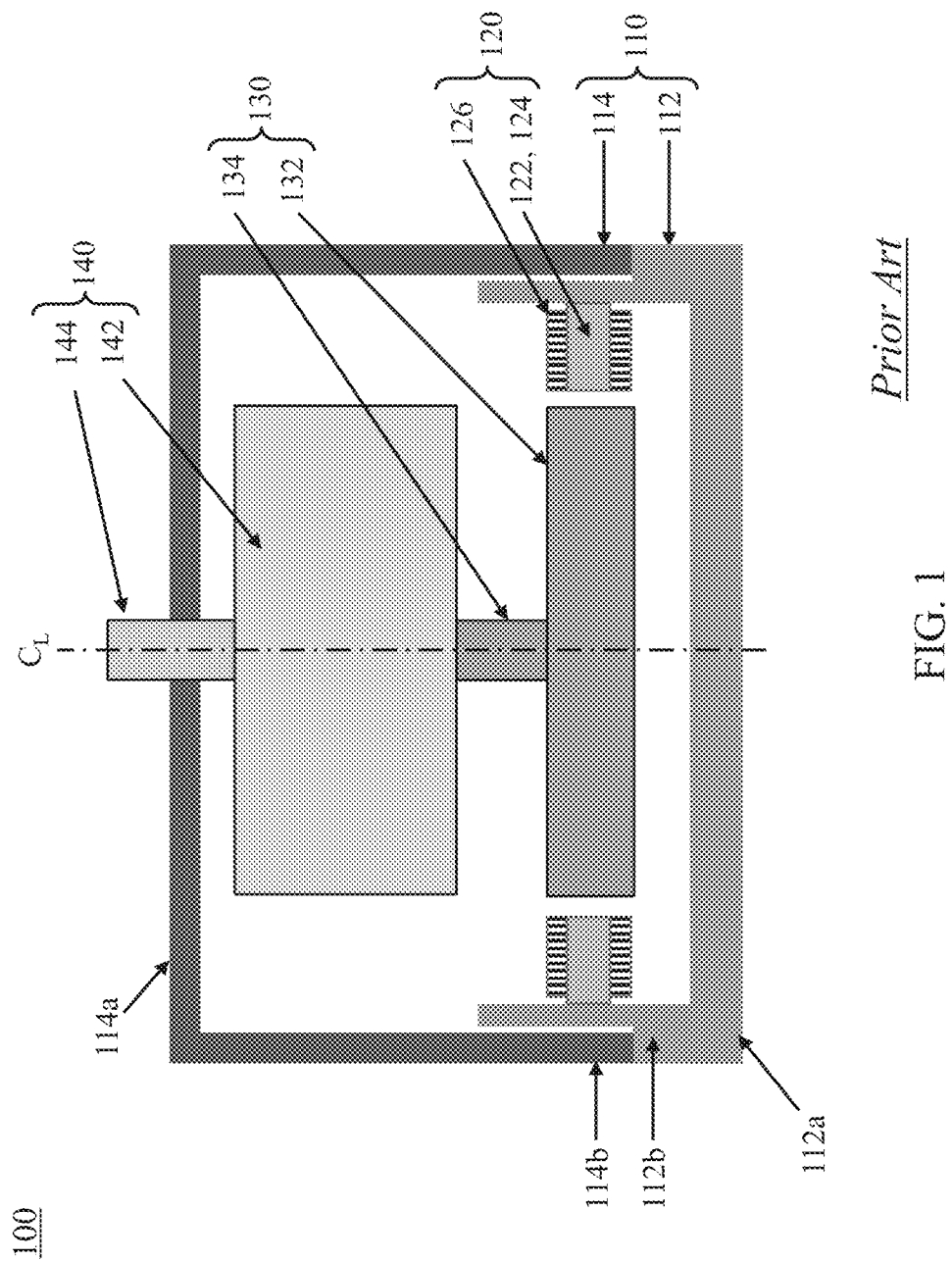
FIG. 1  *Prior Art*

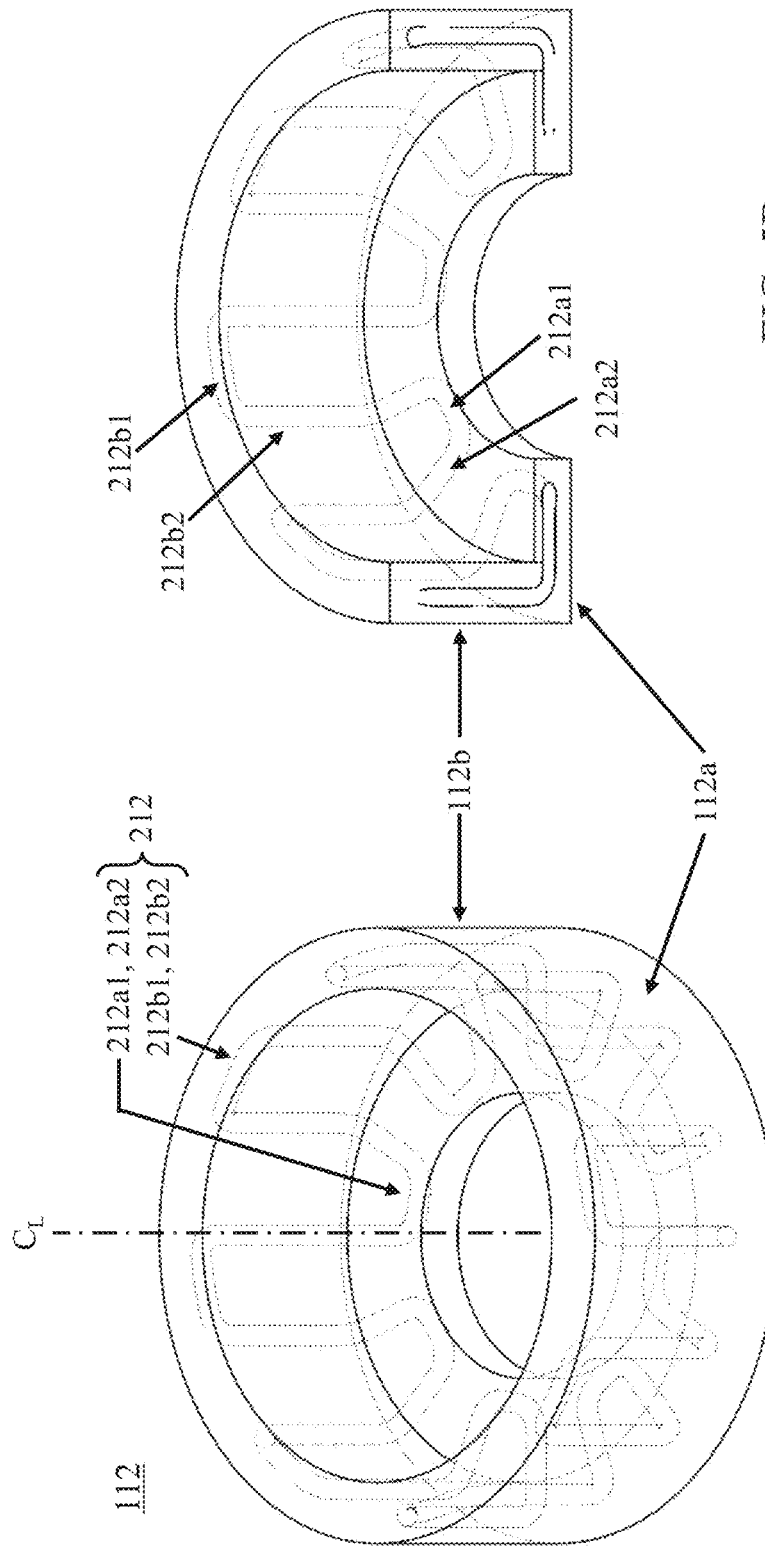

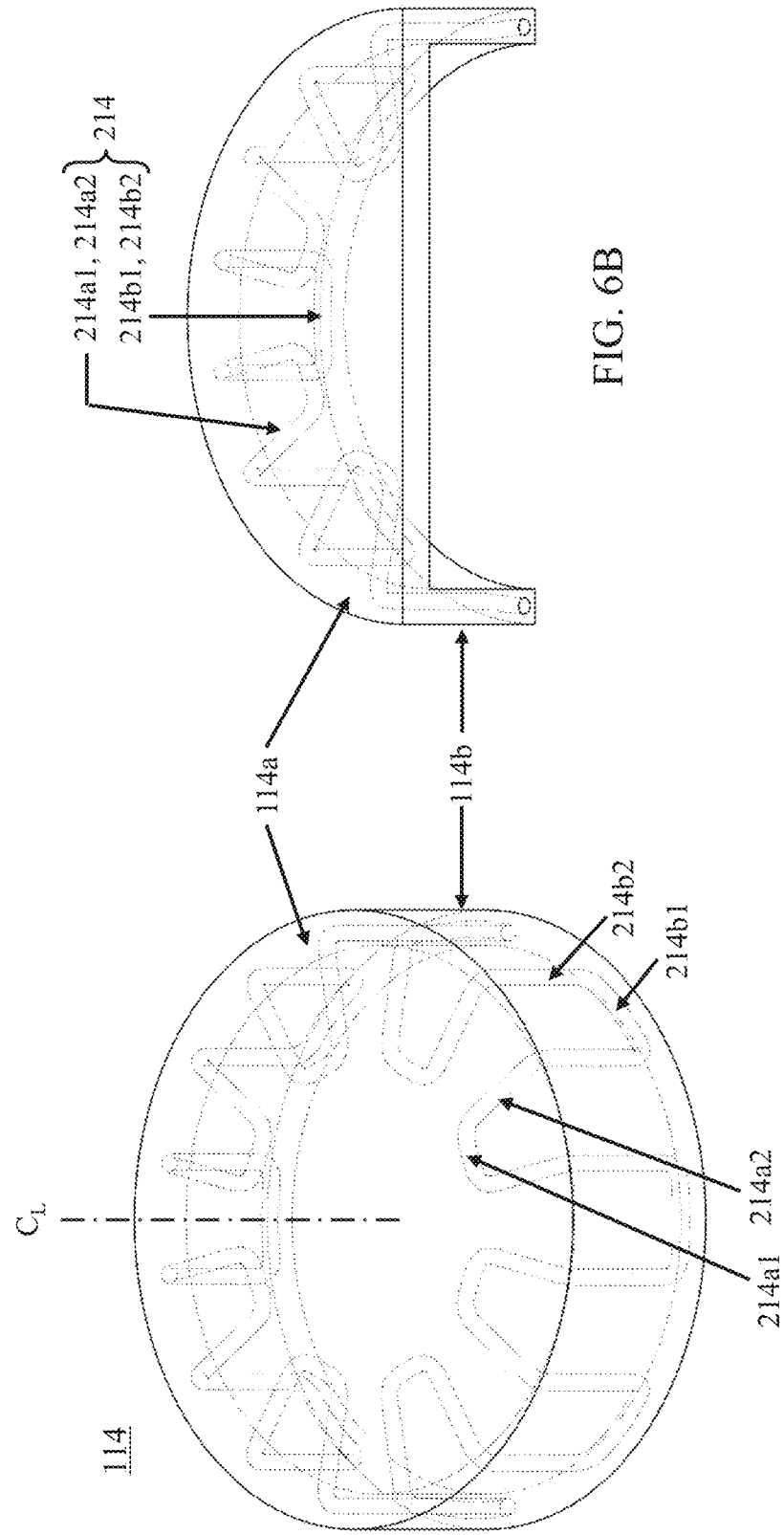

ELECTRIC MOTOR WITH INTEGRATED HEAT EXCHANGER

CROSS REFERENCE TO RELATED APPLICATIONS

The present application claims priority to and the benefit of U.S. provisional patent application Ser. No. 63/323,614 entitled "Electric Motors and Electromagnetic Devices with Innovative Additively Added Integrated Thermal Management", filed on Mar. 25, 2022, the disclosure of which is incorporated herein by reference in its entirety.

STATEMENT OF GOVERNMENT GRANT

This invention was made with government support under Grant No. 80NM0018D0004 awarded by NASA (JPL). The government has certain rights in the invention.

TECHNICAL FIELD

The present disclosure relates to integration of a heat exchanger within electric motors that include a rotor and a stator. More particularly, it relates to thermal management of the electric motors via embedded structures that are configured to implement the function of a heat exchanger. Applications can include any electric motor or electric motor system that includes at least a rotor and a stator.

BACKGROUND

FIG. 1 shows a simplified cross-sectional schematic of a prior art electric motor (EM) system (100) that includes an electric motor (120, 130) fitted within a housing (110). The housing (110) may include a base structure (112) and a top structure (114) that are configured to mate and provide an inner volume of the housing (110). The electric motor (120, 130) may be an electromagnetic motor that includes a (static, fixed) stator (120) and a moving/rotating rotor (130, e.g., magnetic core and rotor windings 132, rotor shaft 134). Optionally, as shown in FIG. 1, a gear assembly (140, e.g., gearbox 142 and output shaft 144) may be coupled to the rotor shaft (134) to provide output to a mechanical load. Although not shown in FIG. 1, the rotor shaft (134) may be held in place via bearings that allow the shaft to rotate. The stator (120) may include one or more pairs of poles (124, e.g., teeth) formed in a core (122, e.g., laminate stack made of iron, core structure) that typically includes an annular shape, and stator windings (126, e.g., insulated copper wire) about each of the one or more pairs of poles (124). As shown in FIG. 1, the core (122) may be fixed (e.g., connected, rigidly coupled, in contact with) to a region of the base structure (112) of the housing (110).

During operation/activation of the prior art EM system (100), current conducted through the stator windings (126) may cause resistive heating of the stator windings (126). Such resistive heating may be considered as the primary source of waste heat of any EM system, including of the prior art EM system (100). In order to transport such heat away from the region of the stator windings (126), the heat must travel through the core (122) of the stator (120), to adjacent structures of the electric motor (e.g., motor housing 110) where it can be dissipated to the environment (e.g., surrounding air, water, cold space). However, the core (122) of the stator (120) may be a poor thermal conductor (e.g., iron) and therefore may provide a poor thermal path for the transport of the heat away from the stator windings (126). Such shortcoming may in turn limit performance of the EM system (100, e.g., operate at lower currents). Furthermore, if heat is not removed away from the region of the core (122) of the stator (120), including from the region of the stator windings (126), in a sufficient and timely manner, the stator windings (126) can overheat, causing melting of their insulation thereby permanently damaging the electric motor.

There are several industries that may require use of high-power electric motors or operation/activation of the electric motors in extreme thermal environments where thermal issues may further exacerbate performance limits of the electric motors. These industries may include, for example:

Advanced high-power robotics, and mobile robotics, including drones.

Electric vehicle actuation including electric cars, airplanes, boats/ships, spaceships, etc.

High temperature environments (e.g., oil downhole, very hot climates) where it is difficult to dissipate heat due to the ambient temperature.

Low temperature environments (e.g., arctic) where waste heat needs to be used for heating other parts of the system.

Although some industrial electric motors may be large enough to allow for added thermal management subsystems that may include, for example, piping to bring liquid coolant to or near the heat source, addition of such subsystems may result in added complexity, including added mass/volume, and potentially negatively impact other performance metrics of the electric motor.

Teachings according to the present disclosure provide a solution to the above-described shortcomings in management of the waste heat in an electric motor.

SUMMARY

According to a first aspect of the present disclosure, an electric motor (EM) system with integrated heat exchanger is presented, the EM system comprising a housing, the housing comprising: a cylindrical shape with a longitudinal extension according to an axial direction; surface area increasing features that protrude outward the cylindrical shape of the housing; and a first group of channel segments for provision of an embedded housing oscillating heat pipe (OHP), the first group of channel segments extending axially and circumferentially within the cylindrical shape of the housing and into the surface area increasing features.

According to a second aspect of the present disclosure, an electric motor (EM) system with integrated heat exchanger is presented, the EM system comprising: a housing comprising a cylindrical shape with a longitudinal extension according to an axial direction; a core structure of a stator, the core structure rigidly coupled to the housing in a region of the longitudinal extension, wherein the housing comprises a first group of channel segments for provision of an embedded housing oscillating heat pipe (OHP) that extends axially and circumferentially within the cylindrical shape of the housing, and the core structure comprises a second group of channel segments for provision of an embedded core OHP.

According to a third aspect of the present disclosure, a method for integrating a heat exchanger with an electric motor (EM) system is presented, the method comprising: forming a first group of channel segments inside of a housing of the EM system; forming a second group of channel segments inside a core structure of a stator that is configured to be coupled to the housing; during operation of the EM system: acquiring heat from the core structure via a working fluid inside of the second group of channel segments; based on the acquiring, coupling an acquired heat to a working fluid inside of the first group of channel segments; based on the coupling, transporting a coupled acquired heat via the working fluid inside of the first group of channel segments to a location of the housing that is remote from the core structure; and based on the transporting, rejecting the heat.

According to a fourth aspect of the present disclosure, a method for integrating a heat exchanger with an electric motor (EM) system is presented, the method comprising: forming surface area increasing features that protrude outward a housing of the EM system; forming a group of channel segments inside of the housing that extend into protrusions of the surface area increasing features; filling the group of channel segments with a working fluid; sealing the working fluid inside the group of channel segments, thereby embedding an oscillating heat pipe (OHP) within the housing; during operation of the EM system: acquiring heat from a core structure coupled to the housing via the OHP; based on the coupling, transporting an acquired heat via the OHP to a location of the housing that includes the protrusions of the surface area increasing features; and based on the transporting, rejecting the heat.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to same features.

FIG. 1 shows a simplified cross-sectional schematic of a prior art electric motor (EM) system.

FIG. 5A shows a (simplified) isometric view of a base structure of an electric motor (EM) system according to an embodiment of the present disclosure with an embedded oscillating heat pipe (OHP) comprising channel segments.

FIG. 5B shows a cutout of the isometric view of FIG. 5A exhibiting details of the channel segments.

FIG. 6A shows a (simplified) isometric view of a top structure of an electric motor (EM) system according to an embodiment of the present disclosure with an embedded oscillating heat pipe (OHP) comprising channel segments.

FIG. 6B shows a cutout of the isometric view of FIG. 6A exhibiting details of the channel segments.

DETAILED DESCRIPTION

Figure 2A:
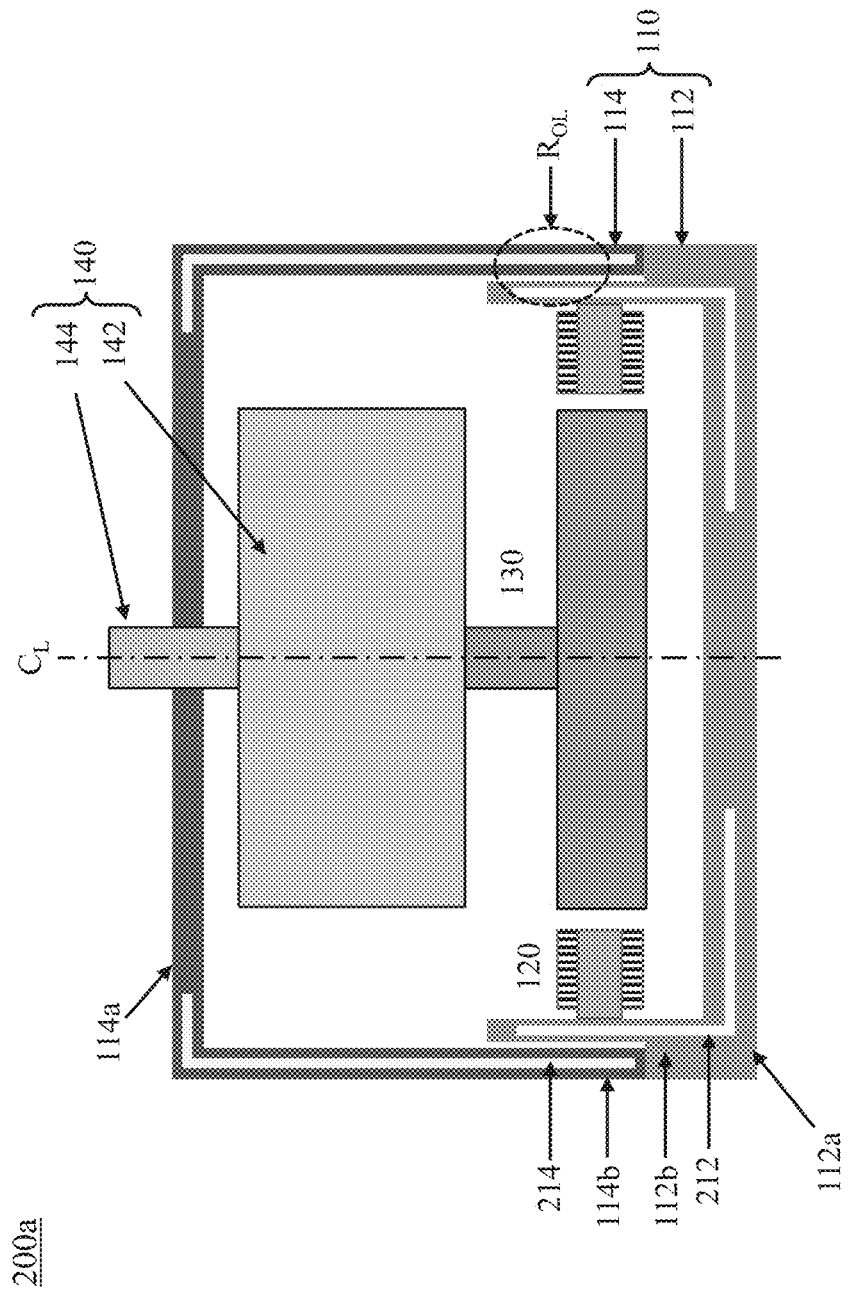
FIG. 2A shows a (simplified) cross-sectional schematic of an electric motor (EM) system with integrated heat exchanger according to an embodiment of the present disclosure, the integrated heat exchanger including heat pipes.

The prior art EM system (100) shown in FIG. 1 may include an axial symmetry about a center axis (e.g., CL) about which (circular, annular, cylindrical) structures of the EM system (100) may be arranged. These include, for example, the base structure (112) and the top structure (114) of the housing (110) that in combination may define the top, bottom and outer lateral/perimeter wall of the EM system (100). As shown in FIG. 1, the base structure (112) may include a base/bottom plate (112a, e.g., circular/round structure about CL) that defines the base of the EM system (100), and the top structure (114) may include a top plate (114a, e.g., circular/round structure about CL) that defines the top of the EM system (100). Furthermore, the base structure (112) and the top structure (114) may include respective axial extensions (112b, e.g., longitudinal extension) and (114b, e.g., longitudinal extension), e.g., cylindrical structures about CL, that define the lateral/perimeter wall of the EM system (100). It should be noted that the simplified cross-sectional schematic of FIG. 1 is not intended to include detailed and complete features of the various structures of the prior art EM system (100), including, for example, details of the geometries of the axial extensions (112b) and (114b). Such details according to some exemplary embodiments of the present disclosure can be found in the isometric views of FIG. 5A and subsequent figures.

Teachings according to the present disclosure modify structures of the prior art EM (100) to integrate features of a heat exchange system (e.g., heat exchanger) that targets management/removal of heat from the stator windings (126). Modifications may include modifying any one or more of the structures of prior art the EM system (100), including the base structure (112), the top structure (114), and/or the core of the stator (112), to provide functionalities of elements of a heat exchanger, such functionalities including: a heat acquisition unit; a heat transport unit; a heat rejection unit; and a heat sink. It should be noted that the configuration of the housing (110) shown in FIG. 1 may represent one exemplary configuration where the both the base structure (112) and the top structure (124) include respective longitudinal extensions (112b) and (114b). Teachings according to the present disclosure may equally apply to different housing configurations, including a configuration (e.g., FIGS. 4D/4E/4F/9 later described) where the (full) longitudinal extension of the housing (110) is provided by the base structure (112).

In the context of the present application, the heat acquisition unit may be defined by regions/structures where the heat generated within the motor (e.g., stator windings) enters the heat exchanger as input heat; the heat transport unit may be defined by regions/structures that move/conduct the input heat from the heat acquisition unit to a remote location of the heat rejection unit; the heat rejection unit may be defined by regions/structures where the transported input heat exits (e.g., rejected from) the heat exchanger; and the heat sink may be defined by regions/structures where the rejected transported input heat is dissipated.

According to some embodiments of the present disclosure, functionalities of the heat exchanger unit may be provided via a combination of one or more of: heat pipes, including for example oscillating heat pipes (OHPs), integrated with structures of the EM system; structures containing pumped fluid coolant, including for example structures attached to, or integrated within, the housing of the EM system; finned structures and/or other structures to increase surface area; couplings between structures; or environment.

As used herein, a heat pipe may refer to a device that uses a saturated two-phase (working) fluid to transport heat via evaporation and condensation, as well as "sensible heat" transport. In other words, a heat pipe is a heat-transfer device that employs phase transition of the working fluid to transfer/transport heat from one surface/interface to another. Transport of the heat is provided via a continuous (e.g., serpentine, meandering) channel into which the working fluid is sealed. An oscillating heat pipe (OHP, also known as a pulsating heat pipe) may refer to a specific implementation of a heat pipe wherein the working fluid in its liquid phase partially fills an inner space/volume of the continuous channel, in this case, a serpentine continuous channel. The working fluid may include a single component or a mixture of a plurality of components for a target performance. It is noted that a OHP in the sense of the present application may be provided by a continuous channel that follows a three-dimensional path, or in other words, a continuous channel that is not confined to a plane.

Teachings according to the present disclosure may take advantage of newer methods for 3D printing (e.g., additive manufacturing) of material suitable for use in the various structures of an electric motor (EM) system. Teachings according to the present disclosure may use 3D printing to form/embed/integrate structures (e.g., channel segments of pipes, fins, surface area increasing structures, ledges, etc.) within the structures of an EM system, such as, for example, within the structures (112, 114, 122) of the EM system (100) described above with reference to FIG. 1, to provide one or more of the functionalities of a heat exchanger. Such integrated structures may, for example, increase effective thermal conductivity or thermal rejection capacity of the EM system. In other words, teachings according to the present disclosure may allow integration of a heat exchanger into an electric motor (EM) system while maintaining a form factor of the EM system.

The (annular, cylindrical) housing (e.g., FIG. 9 later described) of the EM system according to the present disclosure may include a monolithic structure with embedded structures/features to provide functionalities of the heat exchanger. According to some embodiments of the present disclosure, such embedded structures/features may interface with the stator (windings and/or core/laminate stack) to acquire the heat, and with a secondary heat sink such as the environment or a pressurized liquid that flows through the housing. According to an embodiment of the present disclosure, the functionalities of the heat exchanger that are embedded within the housing may include an oscillating heat pipe (OHP, e.g., at least one) that comprises an evaporator section in the vicinity of the heat generating components (e.g., the core/windings of the stator) and a condenser section in the vicinity of the secondary heat sink. The oscillating heat pipe (OHP) may be charged (e.g., loaded, filled, partially filled) with a single component or multi-component saturated two-phase fluid that transports heat from the stator to the secondary heat sink via evaporation, condensation, sensible heat transfer and conduction. According to an embodiment of the present disclosure, the housing of the EM system may include a plurality of monolithically integrated oscillating heat pipes (OHPs) that in combination may provide, for example, redundancy, or piece-wise coverage.

The oscillating heat pipe (OHP) according to the present teachings may follow a convoluted and non-planar path (e.g., three-dimensional serpentine/meandering path, a circuitous path) that simultaneously winds around the annular structure of the housing (e.g., heat exchanger) while also winding back and forth between (regions of) the stator and (regions of) the secondary heat sink. According to an embodiment of the present disclosure, the non-planar path of the OHP according to the present teachings may be periodic. According to another embodiment of the present disclosure, the non-planar path of the OHP according to the present teachings may be aperiodic.

According to an embodiment of the present disclosure, the non-planar path of the OHP according to the present teachings may be provided through an array of (protruding)

structures (e.g., surface area increasing structures/features) that outwardly protrude the housing of the present EM system. According to an exemplary embodiment of the present disclosure, such protruding structures may include fin-type structures (e.g., fins, fin-shaped structures) designed to accommodate the non-planar path of the OHP. According to an embodiment of the present disclosure, the fin-type structures may include an array of (protruding) bodies that are part of the monolithic structure of the housing. In other words, the array of bodies protrudes from the housing, and each body (or many of the bodies) may contain a channel segment of the oscillating heat pipe (OHP).

According to an exemplary embodiment, the non-planar path of the oscillating heat pipe (OHP) of the present teachings may be periodic. A single period of such non-planar path may first pass through (e.g., start from) a (stator) region of the housing that is near to (e.g., adjacent) the stator, and then move out into the protruding bodies (e.g., fins) of the housing and then move back towards the stator region. Such pattern provided by the single period of the non-planar path may continue around a circumference of the housing of the EM system. The pattern provided by the single period of the non-planar path may pass through one or more of the plurality of protruding bodies before returning to the stator region.

The non-planar path of the oscillating heat pipe (OHP) according to the present teachings may be contained in a three-dimensional space and may be defined by a cylindrical coordinate system (e.g., with reference to a center axis passing through a center of the cylindrical housing). Accordingly, the non-planar path of the OHP may include segments that follow the radial, longitudinal or circumferential directions. According to a nonlimiting embodiment of the present disclosure, the non-planar path of the OHP may simultaneously spiral downwards along a circumference of the housing while also meandering in the radial direction between regions near the stator (e.g., heat source) and regions of the protruding bodies (e.g., near heat sink). According to another nonlimiting embodiment of the present disclosure, the non-planar path of the OHP may move in a circumferential direction while simultaneously meandering in the radial direction between the regions near the stator and the regions of the protruding bodies. According to yet another nonlimiting embodiment of the present disclosure, the non-planar path of the OHP may move in a longitudinal direction while meandering back and forth in a radial direction between the regions near the stator and the regions of the protruding bodies. The non-planar path of the OHP according to the present teachings may move back and forth (meander) in the radial direction between the heat source (stator) and heat sink (e.g., fins, protrusions).

The protruding bodies according to the present disclosure may be formed according to a variety of shapes. According to an embodiment of the present disclosure some of the protruding bodies may include embedded channel segments that in combination form the continuous non-planar (serpentine/meandering) path, each embedded channel segment comprising one or more of axial/longitudinal, radial and/or circumferential channel segments in communication to provide a continuous embedded channel segment. According to an embodiment of the present disclosure all of the protruding bodies may include embedded channel segments that in combination form the continuous non-planar (serpentine/meandering) path, each embedded channel segment comprising one or more of axial/longitudinal, radial and/or circumferential channel segments in communication to provide a continuous embedded channel segment.

According to an embodiment of the present disclosure an embedded channel segment that is included in a protruding body may follow an outer contour of the protruding body. According to an embodiment of the present disclosure an embedded channel segment that is included in a protruding body may include a portion that follows an outer contour of the protruding body, and a portion that does not follow the outer contour of the protruding body. According to an embodiment of the present disclosure, a shape of a protruding body with an embedded channel segment may include one of: (1) an arch-shaped pin, (2) a flat fin (e.g., fin-shaped structure), (3) a loop-shaped structure, (4) a conformal fin (having an outline/contour) that follows a meandering inward/outward path of the embedded channel segment (e.g., inward towards the cylindrical contour of the housing and outward away from the cylindrical contour), or (5) a combination of (1) through (4). Applicants of the present disclosure note that efficiency and effectiveness of the protruding bodies, such as for example, fins, can be substantially enhanced by the presence of an embedded heat pipe (e.g., OHP). For example, fins that contain an embedded OHP, or segments thereof, can be significantly longer and narrower (high aspect ratio) compared to fins that do not contain an OHP.

According to an exemplary embodiment of the present disclosure, the protruding bodies may protrude into a surrounding environment that may provide functionality of a heat sink to dissipate the transported heat. According to another exemplary embodiment of the present disclosure, the protruding bodies may protrude into a cavity that contains a flowing/pressurized fluid (e.g., liquid coolant) that removes the heat from the protruding bodies, including from the embedded channel segments, and therefore from the OHP.

FIG. 2A shows a (simplified) cross-sectional schematic of an electric motor (EM) system (200a) with integrated heat exchanger according to an embodiment of the present disclosure, the integrated heat exchanger including heat pipes (212, 214, e.g., OHPs). As can be seen in FIG. 2A, the EM system (200a) may be based on the prior art EM system (100) of FIG. 1A with modified structures (112, 114) for added thermal conductivity. In particular, the base structure (112) of the EM system (200a) may include an oscillating heat pipe (212, OHP) defined by a three-dimensional channel path (212, e.g., made of a plurality of contiguous channel segments) for conduction of a sealed working fluid, the channel path (212) extending through a region of the base structure (112) adjacent the stator (120). According to an embodiment of the present disclosure, the channel path (212) may be a continuous serpentine (e.g., meandering) channel that alternates between the base/bottom plate (112a) and the axial extension (112b) of the base structure (112) while traveling through a circumference of the base structure (112). According to an embodiment of the present disclosure, a number of alternations of the channel path (212) between (112a) and (112b) may be increased for an increase in performance of the integrated heat exchanger. Further details of the channel path (212) may be found in FIGS. 5A-5B later described.

With continued reference to FIG. 2A, the top structure (114) of the EM system (200a) may include an oscillating heat pipe (214, OHP) defined by a three-dimensional channel path (214) for conduction of a sealed working fluid, the channel path (214) extending through a region of the top structure (114) adjacent a region of the base structure (112) that contains a part/segment of the channel path (212). In other words, parts/segments of the channel paths (212, OHP)

and (214, OHP) overlap (e.g., in the axial direction/extension referenced to CL, region $R_{OL}$ in FIG. 2A). According to an embodiment of the present disclosure, the channel path (214) may be a continuous serpentine channel that alternates between the top plate (114a) and the axial extension (114b) of the top structure (114) while traveling through a circumference of the top structure (114). According to an embodiment of the present disclosure, a number of alternations of the channel path (214) between (114a) and (114b) may be increased for an increase in performance of the integrated heat exchanger. Further details of the channel path (214) may be found in FIGS. 6A-6B later described.

The overlap provided by the channel paths (212, 214) of the configuration shown in FIG. 2A may allow thermal coupling between the two channel paths (212, 214) so that heat from the hotter base structure (112) may be transported to the top structure (114) for conduction through the (cooler) top plate (114a). In other words, in the configuration of FIG. 2A, the heat pipe (212) may provide the functionality of a heat acquisition unit that acquires heat from a region that is close to (but separate from) the stator (120), the heat pipe (214) may provide the functionality of a heat transport unit that transports the acquired heat from the overlap region (e.g., $R_{OL}$ of FIG. 2A) to a remote region at the top plate (114a) where the (acquired and transported) heat is rejected through the environment (e.g., outside with respect to the inside of the housing 110). It should be noted that although the overlap region (e.g., $R_{OL}$ of FIG. 2A) may allow a closer relative distance between the heat pipes (212) and (214), such overlap may not be considered as limiting the scope of the present disclosure, as configurations without such overlap may equally be considered (e.g., FIGS. 4C/4D later described).

According to some embodiments of the present disclosure, any two or more structures used in the EM system with integrated heat exchanger of the present teachings, including the base structure (e.g., 112 of FIG. 2A), the top structure (e.g., 114 of FIG. 2A), and the stator (e.g., 120 of FIG. 2A, including stator core 122) may be fastened/bolted to one another, or in the alternate fabricated as a single monolithic structure, to form an assembly having a symmetry about the center axis (e.g., CL of FIG. 2A). According to further embodiments of the present disclosure, each of the elements (112a, 112b) of the structure (112) and/or elements (114a, 114b) of the structure (114) may be separate elements that are fastened/bolted to one another to form the respective structure. According to further embodiments of the present disclosure, the structure (112) and/or the structure (114) may be fabricated as a single monolithic structure. In other words, teachings according to the present disclosure may allow integration of a heat exchanger to an EM system that may include additively fabricated/manufactured monolithic structures and/or traditionally fabricated/assembled structures.

As used herein, a monolithic structure may refer to a three-dimensional structure comprising functional elements bonded to one another via atomic bonds of a material (or materials) that makes the structure. This may therefore include a single material structure formed via subtractive manufacturing, a single or multi material structure formed via additive manufacturing, or a combination of the two. Accordingly, a monolithic structure according to the present disclosure may not include any fasteners/bolts or welding/glue to form a three-dimensional shape of the structure. In some cases, by reducing (e.g., integrating) a plurality of structures/elements of an EM system to a single monolithic structure, enhanced thermal conductivity of such structure, and therefore of an EM system using such structure, may be provided. Furthermore, by reducing the plurality of structures/elements of the EM system to a single monolithic structure, improved continuity and integration of the structures (e.g., OHPs, channel paths) that provide functionalities of the heat exchanger according to the present disclosure may be provided.

The monolithic structure according to the present disclosure may be manufactured through a variety of methods, known generically as additive manufacturing methods, including but not limited to powder bed fusion, direct energy deposition, ultrasonic additive manufacturing, wire arc additive manufacturing, binder jetting, bound metal deposition, bound powder extrusion, etc. Teachings according to the present disclosure may take advantage of flexibility and scalability provided by the additive manufacturing methods presently available to form single material or multi material monolithic structures with embedded thermal management.

The monolithic structure according to the present disclosure may be a multi material monolithic structure that may include monolithically integrated structures made of different materials. Use of the different materials may aim to avoid deleterious interactions between active elements (e.g., working fluids) of the integrated heat exchanger unit (e.g., thermal management system) of the present teachings and structures/elements of the EM system (e.g., magnetic/electric characteristics of the stator core). Such monolithically integrated structures may include claddings, plating, or functional gradients. In some exemplary embodiments of the present disclosure, the monolithically integrated structures may also include integrated weld couplings for fluid or structural joining.

Teachings according to the present disclosure may allow use of different materials for fabrication (e.g., of the housing (e.g., 100 of FIG. 2A) of the EM system as a monolithic structure. Such materials may not be limited to traditional metal-based materials, and may include non-metal (e.g., non-electric-conductive) materials such as polymers and ceramics.

As related to metal-based materials, these may include steels, superalloys, aluminum alloys, or titanium allows. Steels (e.g., stainless, carbon, etc.) may provide the advantages of high strength, fracture toughness, processability, and low cost, and therefore may be used in prior art EM systems, including for the housing of such EM systems. However, poor thermal conductivity of steel may be considered as a hinderance in removing heat from such EM system, which hinderance may be obviated by the present teachings.

As related to superalloys (e.g., Inconel™, Haynes™, Ni-based, Co-based, Cr-based), such materials may have higher thermal conductivity, but their difficulty to process and expense can make them often prohibitive for use. Additive manufacturing of structures of an EM system (e.g., housing) according to the present teachings may reduce the relative cost of the material as a fraction of the final cost of the structures, while also allowing high temperature performance, operation in corrosive environments, or a combination thereof. Furthermore, additive manufacturing may allow to closely mimic the coefficient of thermal expansion of other common parts/structures of an EM system (e.g., electric motor) if and when needed.

As related to aluminum alloys, such materials may offer increased thermal conductivity for moving heat into the channels segments of the oscillating heat pipes (OHPs) embedded within structures of the EM system according to the present disclosure for increased thermal performance of such structures, while also offering a reduced of mass.

As related to titanium alloys, typically such materials may not be considered for a housing of an electric motor/system due to their high cost, difficulty to machine, and poor thermal conductivity, all of which may be mitigated by additively manufactured structures (e.g., housing) with integrated/embedded oscillating heat pipes according to the present teachings. Accordingly, structures according to the present teachings may offer increased strength while reducing mass of the EM system (e.g., housing).

Polymers and ceramics (e.g., technical ceramics) may be considered a poor choice for housing materials as they are thermal insulators and would rapidly cause the core windings of an electric motor/system to get too hot. However, with integrated/embedded oscillating heat pipes (OHPs) according to the present teachings, it may be possible to achieve similar thermal conductivities to common metal alloys used in currently known (prior art) housings. Accordingly, the present teachings may create a new class of lightweight, electrically insulating, chemically inert housings made of polymers or ceramics. The housing according to the present disclosure may be fabricated with Polymers capable of being manufactured in excess of 95% density to prevent the formation of percolating porosity, thereby keeping a leak tight system (e.g., housing with embedded OHPs). Nonlimiting examples of polymers may include olyamides, polyethylene, acetal, ABS (acrylonitrile butadiene styrene), polycarbonate, polyester, PTFE (polytetrafluoroethylene), PEEK (polyether ether ketone), PEKK (polyetherketoneketone), polyamides, polyetherimide, or perfluoroalkoxy.

Technical ceramics may not only offer the benefits of polymer when used as material of the structures (e.g., housing) of the EM system according to the present disclosure but may also provide the additional benefit of retaining their properties at cryogenic temperatures while offering minimal moisture absorption and, in general, the smallest coefficient of thermal expansion of any material class. This may enable the structures to operate effectively across wide temperature ranges, while the integrated OHP will make sure they keep the entire structure, and the EM system, thermally uniform. Nonlimiting examples of technical ceramics materials may include aluminum oxide, aluminum nitride, boron carbide, magnesium oxide, silicon carbide, silicon nitride, tungsten carbide, zirconia, boron nitride, or aluminum oxynitride.

With reference back to FIG. 2A, according to an embodiment of the present disclosure, each of the structures (112) and (114) may be monolithic structures with respective monolithically integrated structures (212, OHP, channel path) and (214, OHP, channel path). Accordingly, to an embodiment of the present disclosure the OHP (212) may be independent and separate from the OHP (214). In other word, each of the OHP (212) and (214) may be sealed and contain a respective working fluid.

Figure 2B:
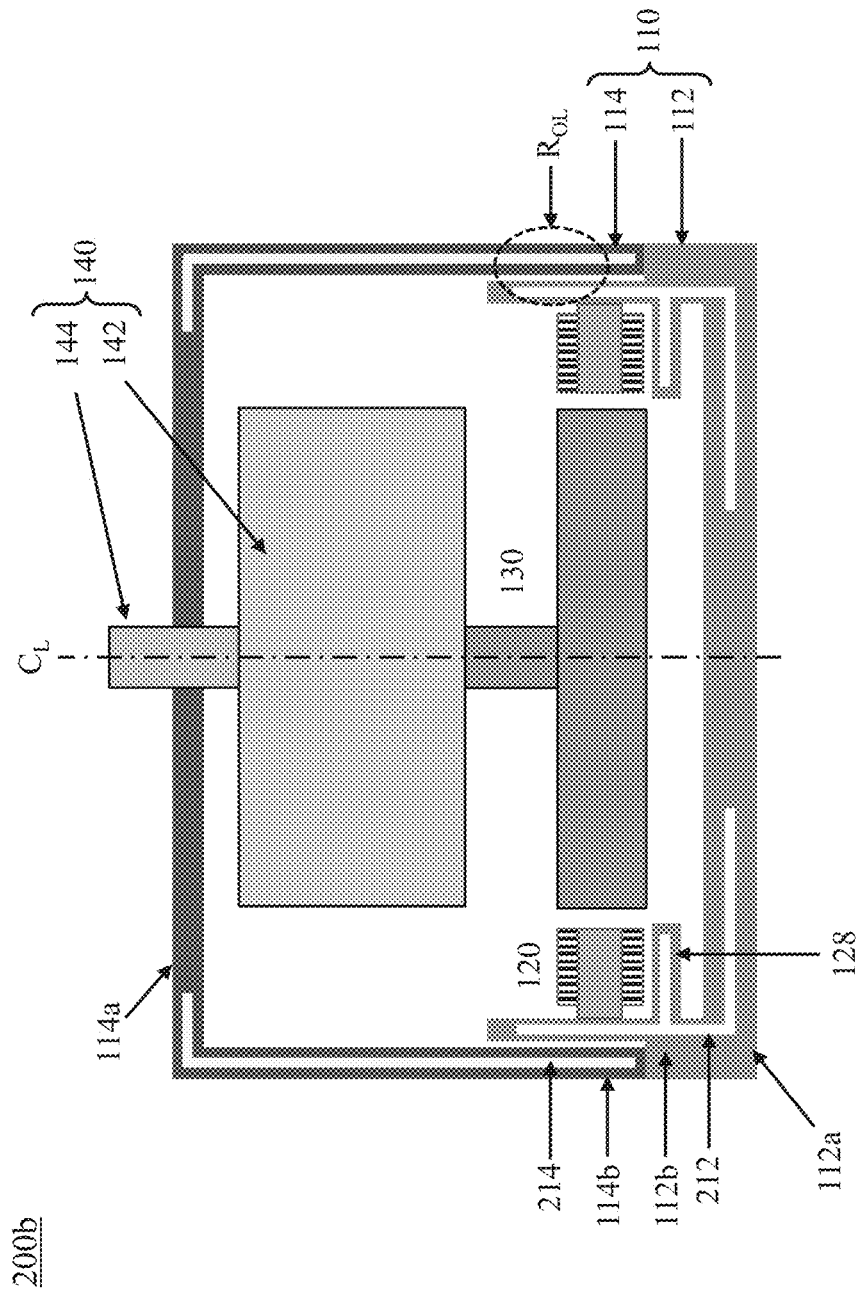
FIG. 2B shows a (simplified) cross-sectional schematic of an electric motor (EM) system with integrated heat exchanger according to an embodiment of the present disclosure, the integrated heat exchanger including a ledge structure.

FIG. 2B shows a (simplified) cross-sectional schematic of an electric motor (EM) system (200b) with integrated heat exchanger according to an embodiment of the present disclosure, the integrated heat exchanger including a ledge structure (128, with symmetry about CL). The EM system (200b) of FIG. 2B may be considered as an extension of the EM system (200a) of FIG. 2A with the ledge structure (128) added at a region immediately underneath the source of heat (i.e., stator 120). Due to its proximity to the stator (120) that is the source of the heat, and its structural coupling to the base structure (112), heat from the stator (120) may be further coupled through the ledge structure (128) to the base structure (112), for an increased performance in heat acquisition of the integrated heat exchanger. According to an embodiment of the present disclosure, the stator may be coupled to the ledge structure (128) through a thermally conductive and insulating compound for increase coupling of the heat to the ledge structure (128). According to an exemplary embodiment of the present disclosure, the ledge structure (128) may further include embedded channel segments that communicate with the channel path (212) to form a single OHP (e.g., 212) thereby providing further increased performance in heat acquisition of the integrated heat exchanger.

According to an exemplary embodiment of the present disclosure, the ledge structure (128) may include a radial profile that overlaps with all or a portion of (a radial profile of) the stator (120, e.g., core of the stator). According to an exemplary embodiment of the present disclosure, the ledge structure (128) may include a radial profile that overlaps with the poles (e.g., 124 of FIG. 1) of the stator (120). According to an exemplary embodiment of the present disclosure, the ledge structure (128) may be monolithically integrated with the base structure (112). In other words, the structures (112, 128) may be fabricated as a single monolithic structure.

Figure 3A:
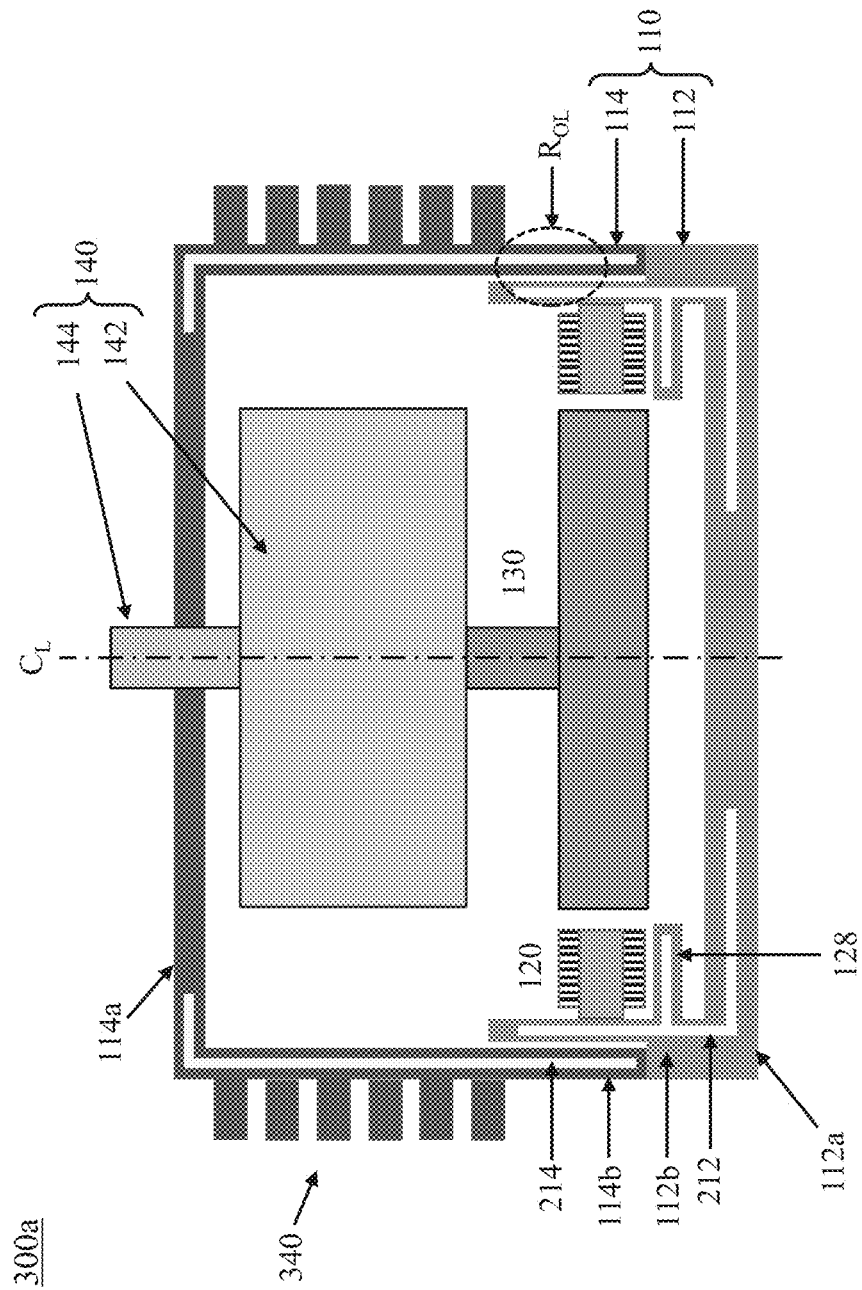
FIG. 3A shows a (simplified) cross-sectional schematic of an electric motor (EM) system with integrated heat exchanger according to another embodiment of the present disclosure, the integrated heat exchanger including structures to increase surface area.

FIG. 3A shows a (simplified) cross-sectional schematic of an electric motor (EM) system (300a) with integrated heat exchanger according to another embodiment of the present disclosure, the integrated heat exchanger including a plurality of fins (340, e.g., surface area increasing structures/features). As shown in FIG. 3A, the plurality of fins (340) may be arranged outward the top structure (114) and in a region of the top structure (114) that may extend from the top plate (114a) to the overlap region, $R_{OL}$. The plurality of fins (340) may further contribute to the rejection of the heat from the integrated heat exchanger of the EM system (300a) for an increased performance in heat rejection capability when compared to the configurations shown in FIGS. 2A-2B. Such increased performance in heat rejection may be attributed to the increased surface area between the housing (110, e.g., top structure 114) and the outside environment provided by the fins (340). It should be noted that the fins (340) may represent one nonlimiting example of surface area increasing structures/features, as other such structures with different shapes, typically in the form of outwardly protrusions (with or without embedded channel segments), but same functionalities may be envisioned. Some exemplary nonlimiting cases are described below in the present disclosure with reference to FIG. 9.

Figure 3B:
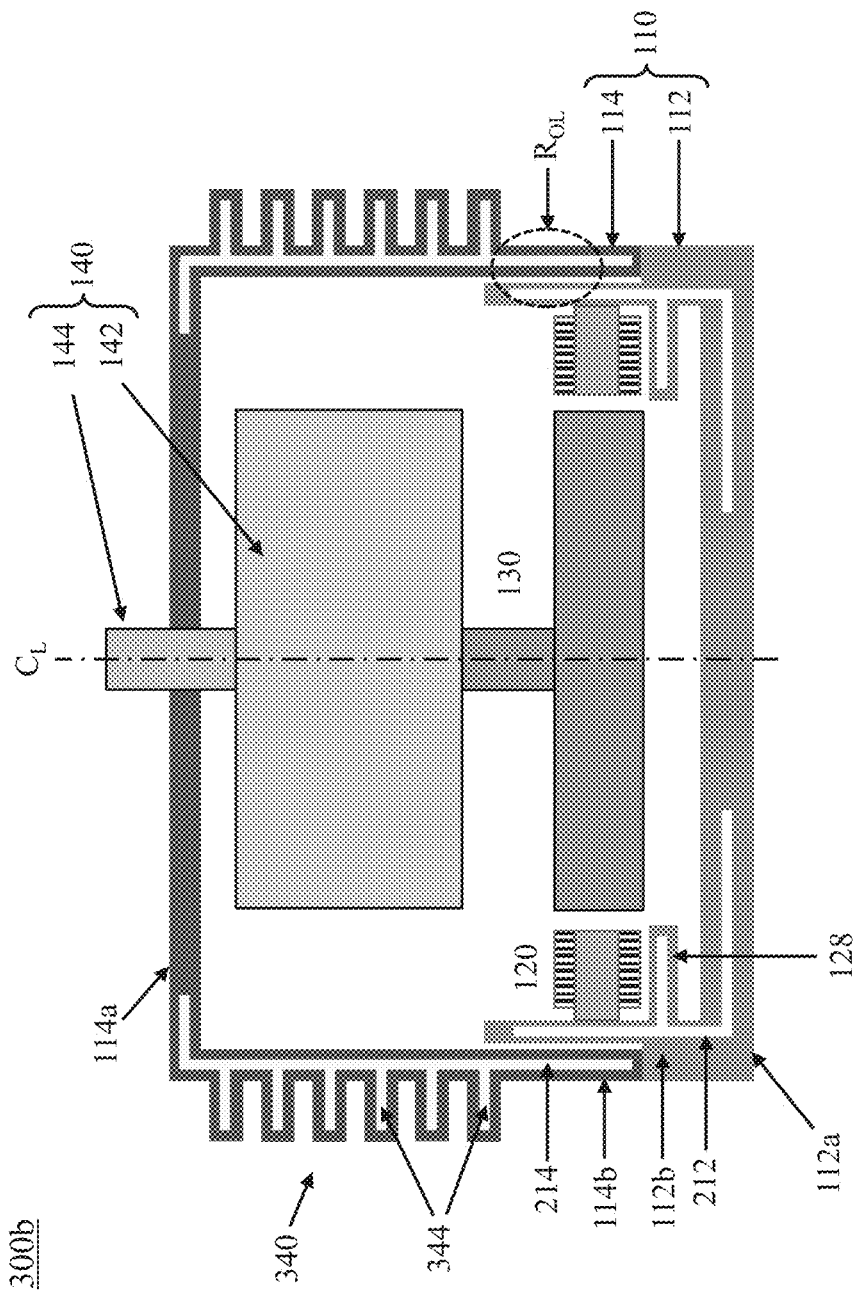
FIG. 3B shows a (simplified) cross-sectional schematic of an electric motor (EM) system with integrated heat exchanger according to another embodiment of the present disclosure, the integrated heat exchanger including structures to increase surface area with embedded channel segments of a heat pipe.

According to an exemplary embodiment of the present disclosure, and as shown in the configuration (300b) of FIG. 3B, the plurality of fins (340) may include embedded channel segments (344) that communicate with the channel path (214) to form a single OHP (214) thereby providing further increased performance in heat rejection of the integrated heat exchanger.

With reference to FIG. 3A and FIG. 3B, according to an exemplary embodiment of the present disclosure, the plurality of fins (340), including the (optional) embedded channel segments (344), may be monolithically integrated with the top structure (114). In other words, the structures (114, 340, 344) may be fabricated as a single monolithic structure. In the alternate, and as shown in the configuration (300c) of FIG. 3C, the plurality of fins (340), with or without embedded channel segments (344), may be provided as a separate structure that may be fastened/bolted to the housing (110). In such alternate case, the embedded channel segments (344) may effectively form a continuous serpentine channel having a channel path that passes through each of the plurality of fins (340) for provision of a heat pipe (e.g., OHP) that is separate from the heat pipe (214).

Figure 3C:
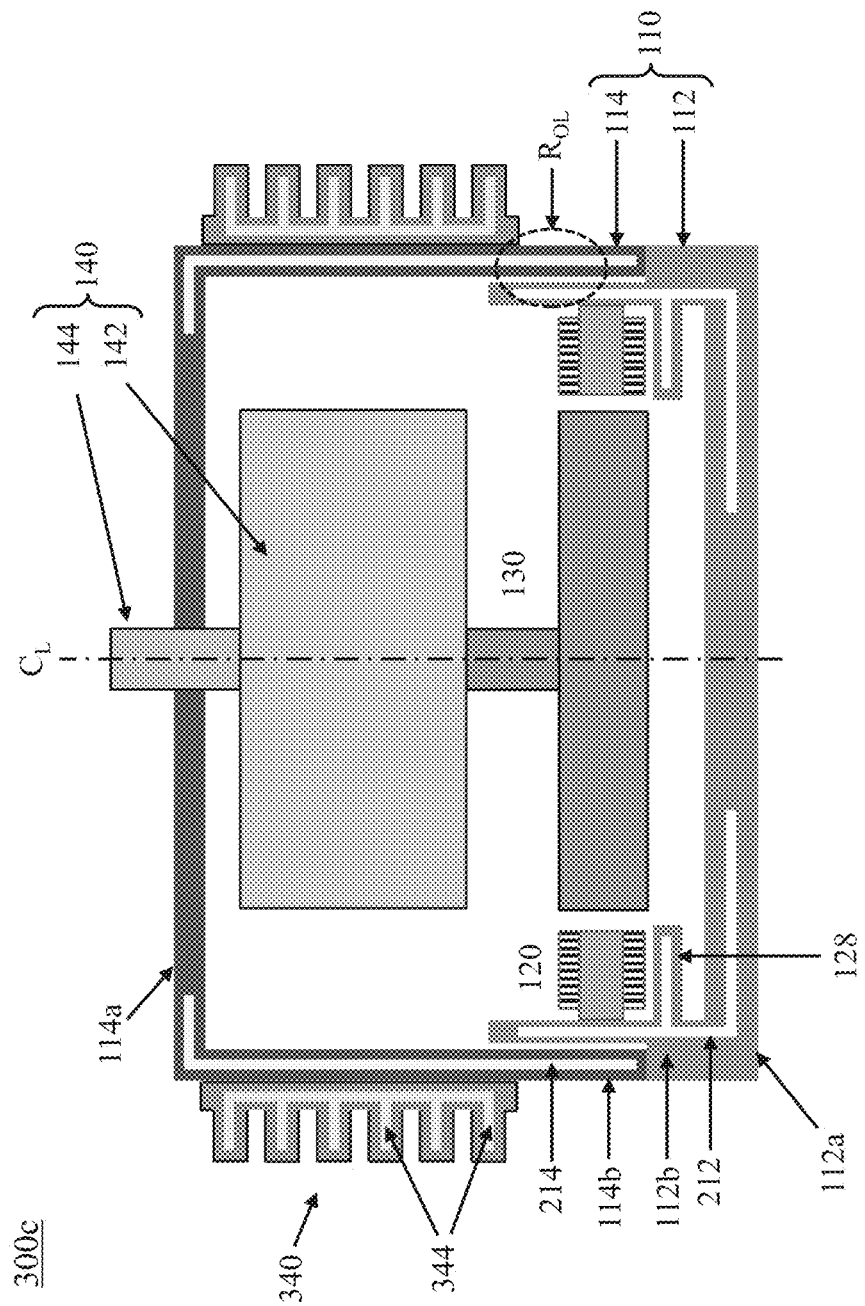
FIG. 3C shows a (simplified) cross-sectional schematic of an electric motor (EM) system with integrated heat exchanger according to another embodiment of the present disclosure, the integrated heat exchanger including structures to increase surface area with an embedded heat pipe.

With further reference to FIG. 3C, according to an embodiment of the present disclosure, the embedded channel segments (344) may be used for circulation (e.g., pumping) of a fluid coolant to provide functionality of an active heat sink of the integrated heat exchanger. In other words, the embedded channel segments (344) of FIG. 3A may include a fluid coolant that in combination operate as a secondary thermal transport system (e.g., heat exchanger) to cool down structures of the EM system (300c), including cooling down of the stator (120). It should be noted that in contrast to the configurations of FIGS. 2A-3B where the heat is rejected to the environment and therefore the integrated heat exchanger may operate to maintain the temperature of the EM system isothermal, the integrated heat exchanger of the EM system (300c) of FIG. 3C may operate to cool down structures of the EM system (300c) to temperature below isothermal conditions (e.g., dictated by outside environment). It should be noted that functionality of the described secondary thermal transport system may be equally provided via a structure with embedded channel segments (e.g., 344) but devoid of fins.

Figure 4A:
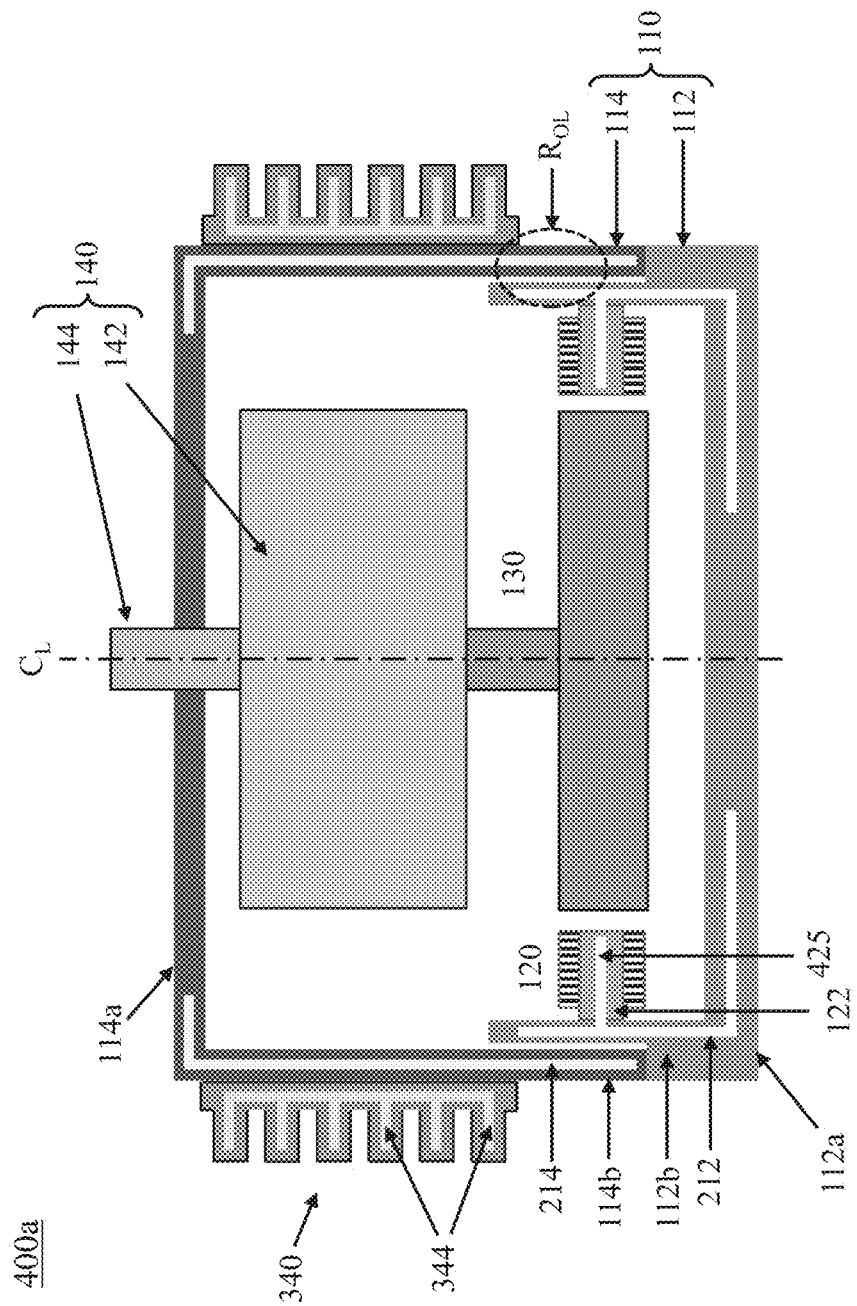
FIG. 4A shows a (simplified) cross-sectional schematic of an electric motor (EM) system with integrated heat exchanger according to another embodiment of the present disclosure, the integrated heat exchanger including channel segments of a heat pipe embedded in a stator.

FIG. 4A shows a (simplified) cross-sectional schematic of an electric motor (EM) system (400a) with integrated heat exchanger according to another embodiment of the present disclosure, the integrated heat exchanger including channel segments (425) of a heat pipe embedded in the core (122) of the stator (120). According to an exemplary embodiment of the present disclosure, the embedded channel segments (425) may communicate with the channel path (212) of the base structure (112) to form a single OHP (e.g., 212) thereby providing further increased performance in heat acquisition of the integrated heat exchanger. Applicant notes that because the source of the heat is in the core windings, the core (122) may be considered as the closest region to the heat source, and therefore a preferred location to sense the heat for input to the integrated heat exchanger of the present teachings. In other words, the configuration shown in FIG. 4A, specifically, the channel segments (425) embedded in the core (122) of the stator (120), may be regarded as a preferred implementation of the integrated heat exchanger of the present teachings. Further details of the channel segments (425) may be found in FIGS. 7A-7C later described.

Figure 4B:
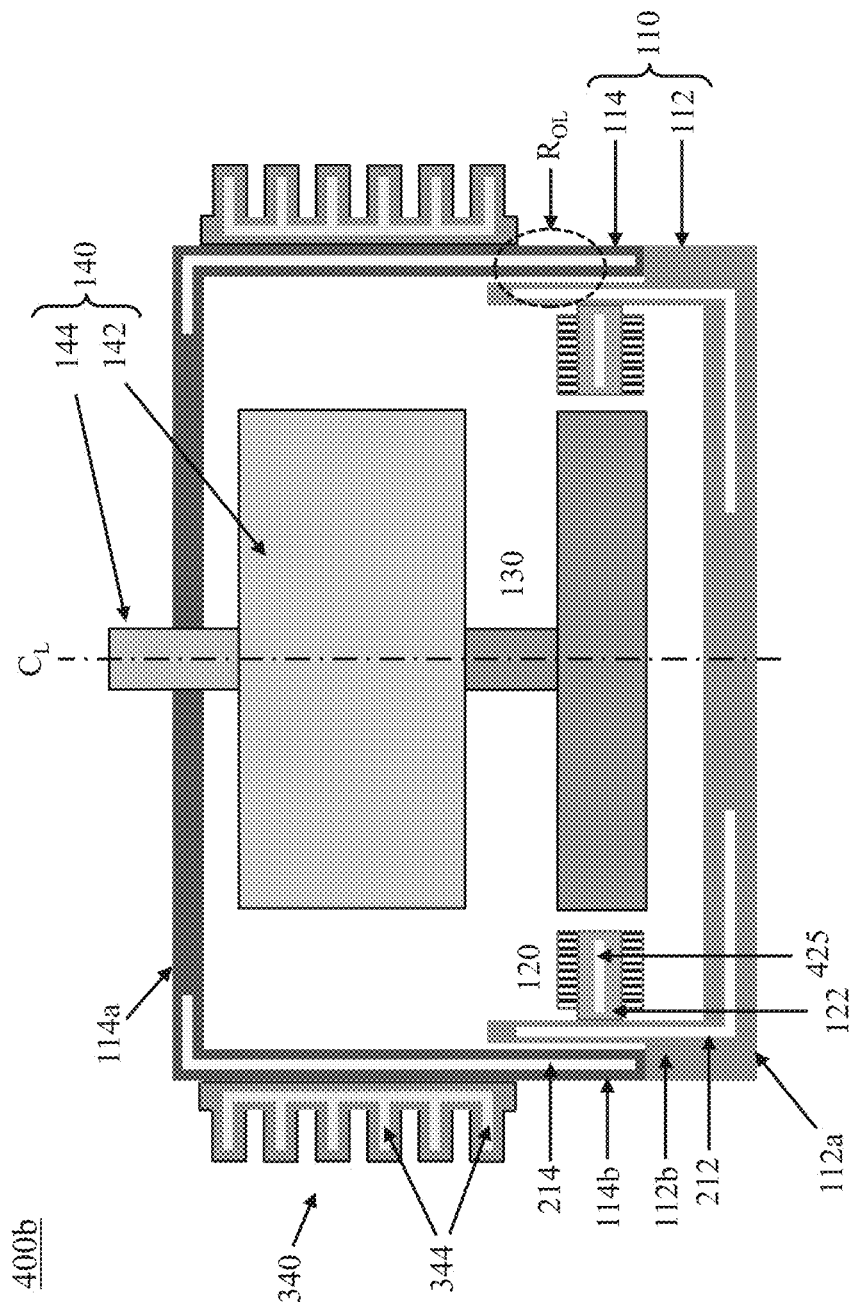
FIG. 4B shows a (simplified) cross-sectional schematic of an electric motor (EM) system with integrated heat exchanger according to another embodiment of the present disclosure, the integrated heat exchanger including a heat pipe embedded in a stator.

It should be noted that the channel segments (425) may not necessarily communicate with the channel path (212) as shown in the FIG. 4A, rather as shown in the configuration (400b) of FIG. 4B, the channel segments (425) may be contiguous and form a separate channel path for provision of a separate heat pipe (425, e.g., OHP).

With reference to FIG. 4A and FIG. 4B, according to an exemplary embodiment of the present disclosure, the channel segments (425) may be formed in a prefabricated (e.g., traditional) core (122) and later bridged to one another and/or to the channel path (212) to form a single OHP (e.g., 212, with reference to FIGS. 7A-7C). According to another exemplary embodiment of the present disclosure, the core (122) may be additively manufactured to include the channel segments (425, with reference to FIGS. 8A-8B). According to yet another exemplary embodiment of the present disclosure, the core (122) may be monolithically integrated with the base structure (112). In other words, the structures (112, 122) may be fabricated as a single monolithic structure with: an embedded continuous serpentine channel for provision of the OHP (e.g., 212 with channel segments 425); or two separate embedded continuous serpentine channels for provision of two separate OHPs (e.g., 212 and 425).

Figure 4C:
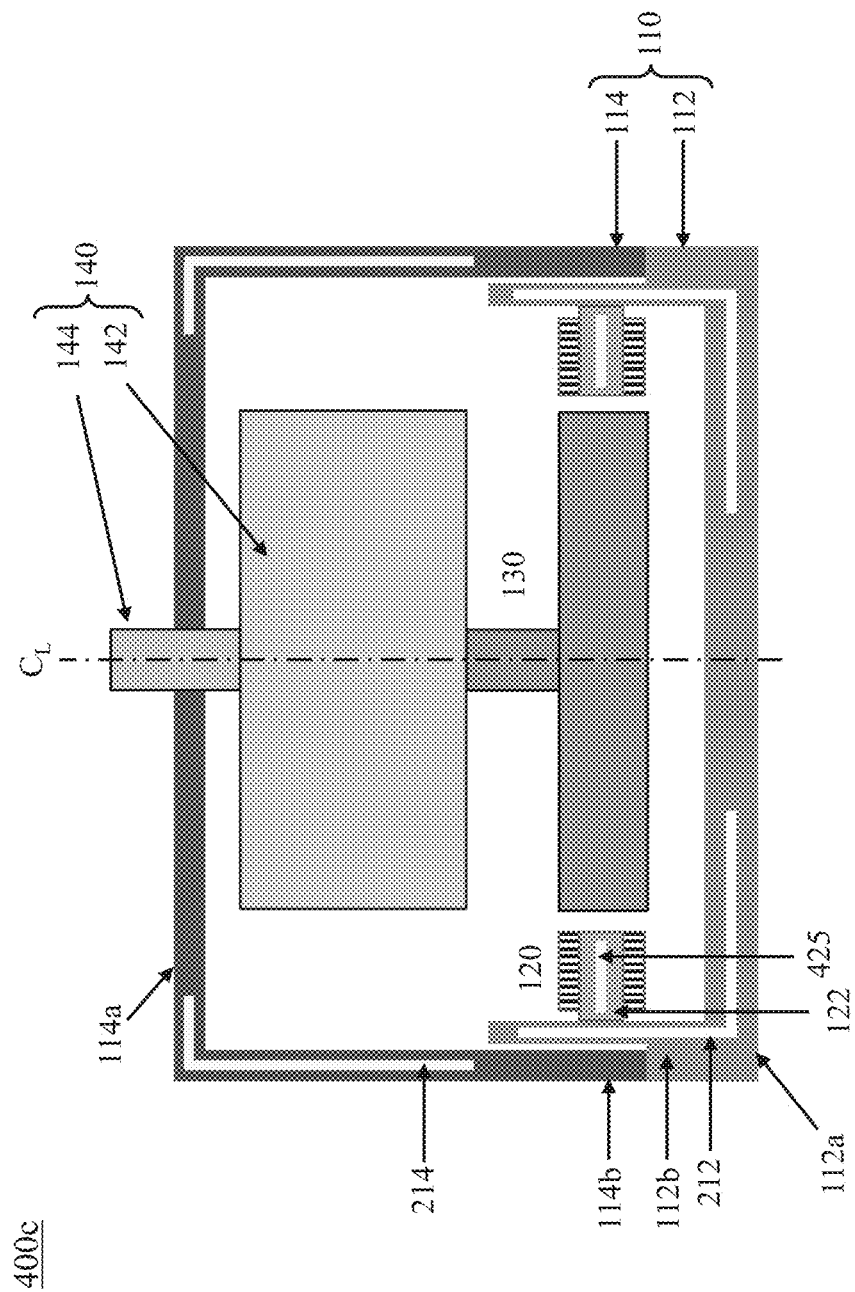
FIG. 4C shows a (simplified) cross-sectional schematic of an electric motor (EM) system with integrated heat exchanger according to another embodiment of the present disclosure, the integrated heat exchanger including a heat pipe embedded in a stator.

It should be noted that the various features described above with reference to FIGS. 2A, 2B, 3A, 3B, 3C, 4A and 4B may be considered as part of a tool kit to configure/generate the various structures (e.g., 112, 114, 122) for provision of the functionalities of the integrated heat exchanger according to the present disclosure. In other words, not all of the above-described features may be included or necessary in order to provide the basic functionalities of an integrated heat exchanger (e.g., a heat acquisition unit; a heat transport unit; a heat rejection unit; and a heat sink). Rather, such features may be selected in view of desired one or more performance metrics, including for example, cost, form factor, environmental use, input/output power requirement, operative temperature limits, etc. As an example, the configuration (400c) of FIG. 4C is based on the configuration (400b) of FIG. 4C but without the finned structure (340) with embedded channel segments (344) and without the overlap region (e.g., $R_{OL}$ of FIG. 2A). Other exemplary nonlimiting embodiments (no figures provided) of an electric motor (EM) system with integrated heat exchanger according to the present disclosure may include, for example: (212, 214, 128, 425); (212, 214, 128, 340) without embedded channel segments; (212, 214, 340, 344) with secondary thermal transport system according to description with reference to FIG. 3C; or (212, 214, 128, 340, 344) with secondary thermal transport system according to description with reference to FIG. 3C.

Figure 4D:
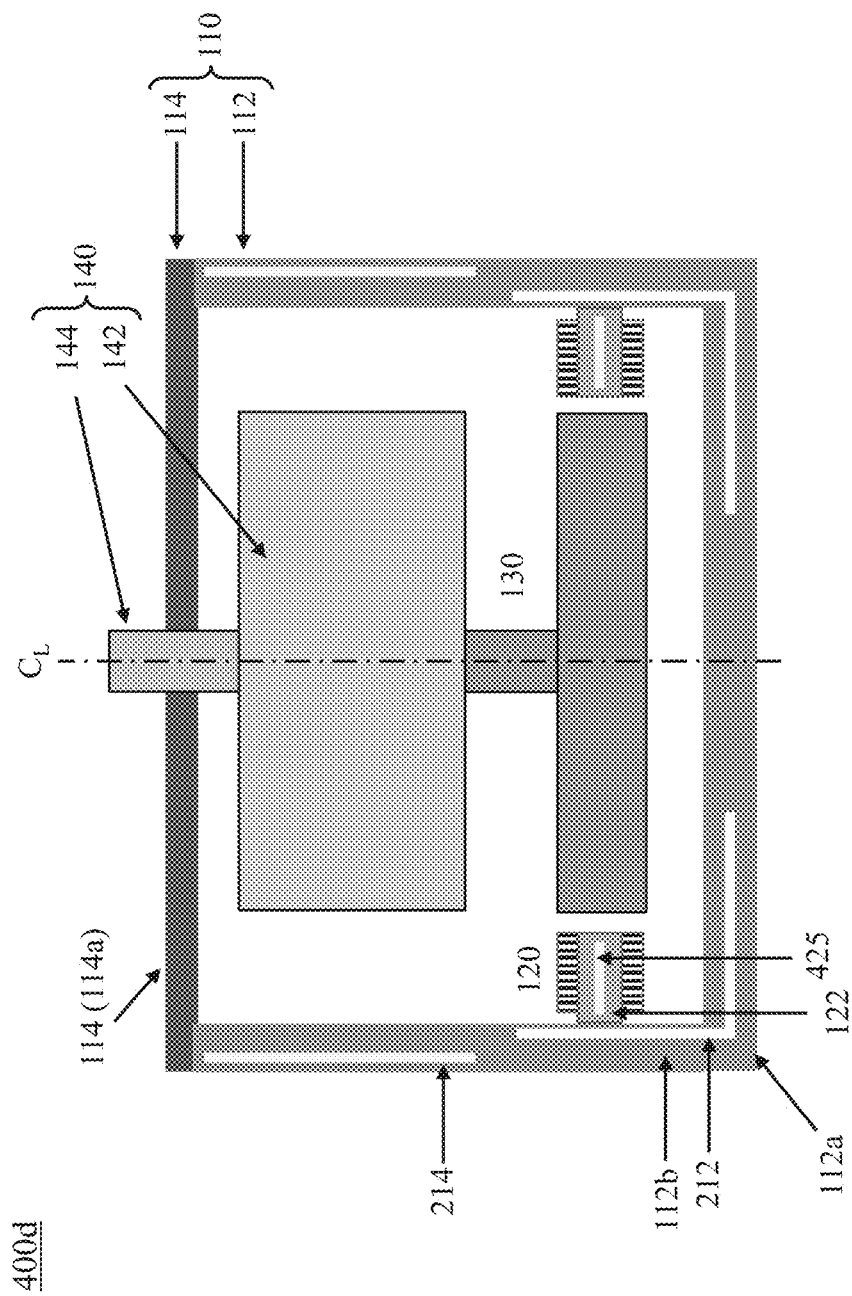
FIG. 4D shows a (simplified) cross-sectional schematic of an electric motor (EM) system with integrated heat exchanger according to another embodiment of the present disclosure, the integrated heat exchanger including two heat pipes in a housing.

As described above, the longitudinal extension of the housing (e.g., 110 of FIG. 2A) may not necessarily be provided by a combination of longitudinal extensions (e.g., 112b, 114b of FIG. 2A) of the base structure (e.g., 112 of FIG. 2A) and top structure (e.g., 114 of FIG. 2A), rather, as shown in FIG. 4D, may also be provided solely (or predominantly) by the longitudinal extension (112b) of the base structure (112). Accordingly, as shown in FIG. 4D, in some embodiments the housing (110) may include the base structure (112) that includes a base plate (112a) and a longitudinal extension (112b) that defines the longitudinal extension of the housing (110), and a top structure (114) that in this case may be reduced to a top plate (114a). Accordingly, as shown in FIG. 4D, the heat pipes (212, 214) of the EM system (400d) may be embedded within the bottom structure (112). It should be noted that in the configuration shown in FIG. 4D, the base structure (112) may equally be referred to as the housing of the EM system (400d) to which the core (122) of the stator (120) is rigidly coupled, and the top structure (114, 114a) may be referred to as the top plate of the housing.

Figure 4E:
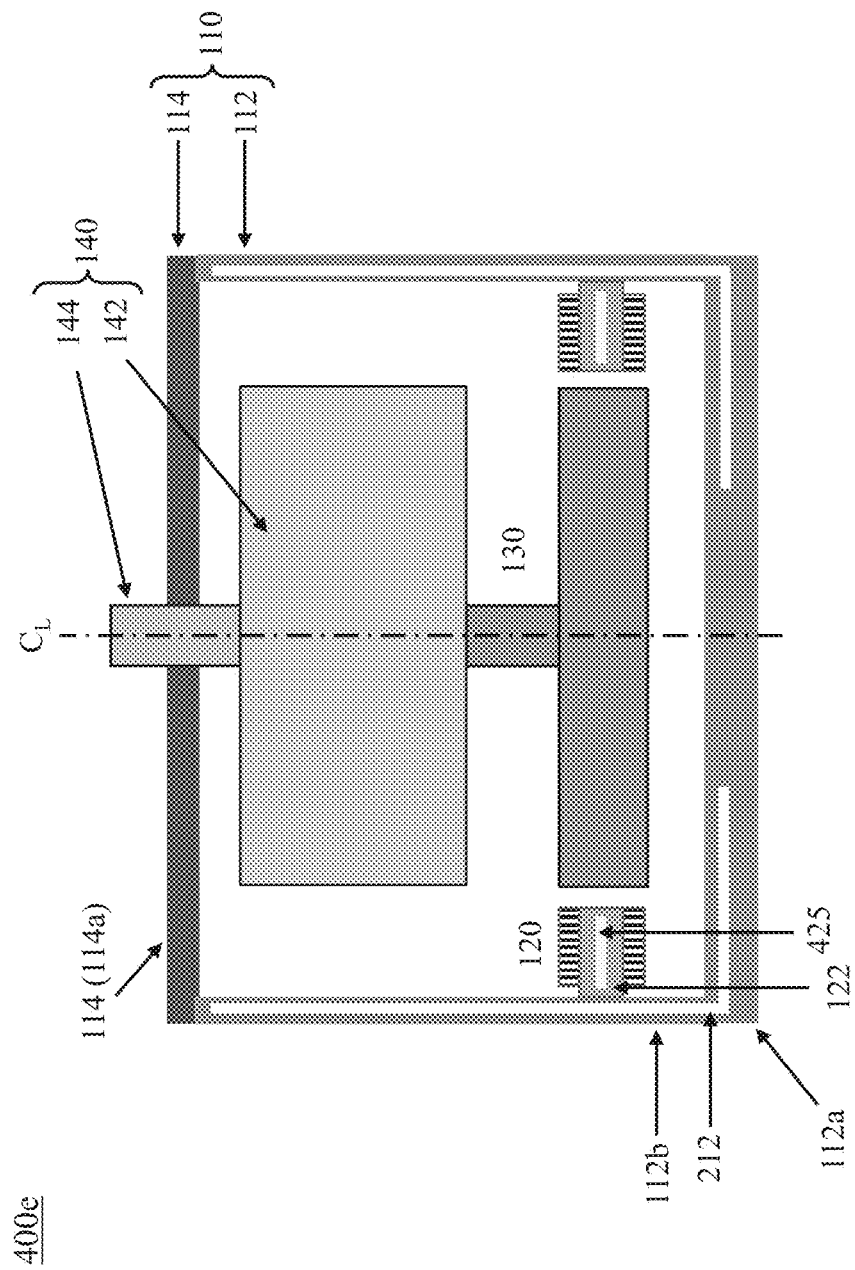
FIG. 4E shows a (simplified) cross-sectional schematic of an electric motor (EM) system with integrated heat exchanger according to another embodiment of the present disclosure, the integrated heat exchanger including one heat pipe in a housing.

FIG. 4E shows a (simplified) cross-sectional schematic of an electric motor (EM) system (400e) with integrated heat exchanger according to another embodiment of the present disclosure, the integrated heat exchanger including (at least) one heat pipe (212) in the housing (110). The configuration of FIG. 4E is based on the configuration of FIG. 4D while combining the two heat pipes (e.g., 212, 214 of FIG. 4D) into a single heat pipe (212) that may extend along the longitudinal extension (112b) of the housing (110). The channel segments (425) shown in FIG. 4E may have same functionalities as described above in the present disclosure.

Figure 4F:
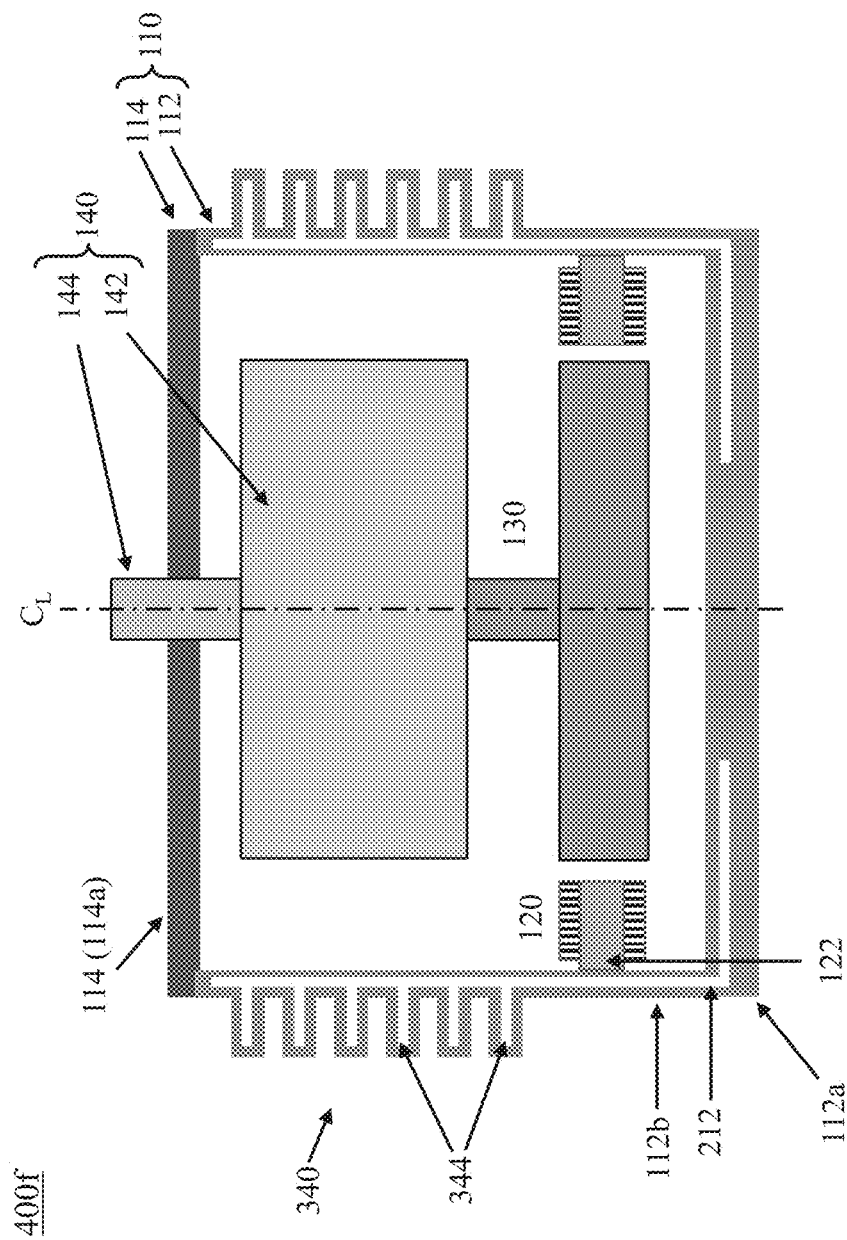
FIG. 4F shows a (simplified) cross-sectional schematic of an electric motor (EM) system with integrated heat exchanger according to another embodiment of the present disclosure, the integrated heat exchanger including structures to increase surface area with embedded channel segments of a heat pipe.

FIG. 4F shows a (simplified) cross-sectional schematic of an electric motor (EM) system (400f) with integrated heat exchanger according to another embodiment of the present disclosure, the integrated heat exchanger including structures/features (340, e.g., fins) with embedded channel segments (344) of a heat pipe (e.g., 212). In the configuration shown in FIG. 4F, the structures/features (340) may be considered as surface area increasing structures/features that may allow for more efficient rejection of the heat through the integrated heat exchanger for a given geometry of the housing (110, e.g., 112). It should be noted that configurations with or without the embedded channel segments (344) may be envisioned. Furthermore, and in view of a desired system performance and/or cost, channel segments (e.g., 425 of FIGS. 4A-4E) may be included in the configuration shown in FIG. 4F. Furthermore, it should be noted that the surface area increasing structures/features (340) may take different shapes, typically in the form of outwardly protrusions, with or without embedded channel segments. Some exemplary nonlimiting cases are described below in the present disclosure with reference to FIG. 9.

According to an exemplary embodiment of the present disclosure, the channel segments according to the present teachings, may have a substantially circular cross section with a diameter that is approximately 1 mm. According to an exemplary embodiment of the present disclosure, the channel segments may have a diameter in a range from 0.50 mm to 8.0 mm. Upper range diameters may be used for some liquid metals (as working fluid) in large (meter-scale) EM systems. According to other exemplary embodiments of the present disclosure, the channel segments may have a cross section that may not be circular, rather rectangular, trapezoidal or other. According to an embodiment of the present disclosure, the channel segments may include major channel segments in the axial or radial orientation/direction (with reference to target EP system). According to an embodiment of the present disclosure, the channel segments may include axial channel segments, radial channel segments, and (substantially) circumferential channel segments, the channel segments join to provide a desired channel path. According to an exemplary embodiment of the present disclosure, the channel segments may follow contours of a corresponding structure or of an adjacent structure. According to an embodiment of the present disclosure, design/routing of the channel segments may aim at reducing loss of characteristic performance (e.g., electrical and/or magnetic performance of the core/stator) of the EM system while enabling an appropriate degree of thermal control provided by the channel segments (when filled and sealed with a working fluid).

According to an embodiment of the present disclosure, the continuous serpentine (meandering) channel according to the present disclosure may form an oscillating heat pipe (OHP) comprising a (pressure filled) working fluid that may be contained within a single structure, or extend across structures, of the EM system. According to an embodiment of the present disclosure, the working fluid may be chosen to increase an amount of latent heat in a liquid to vapor transition. According to an embodiment of the present disclosure, the working fluid may be further chosen to include a larger expansion ratio for a given temperature range of operation of a target EM system. According to an embodiment of the present disclosure, the working fluid may be further chosen based on a desired magnetic property of the working fluid which may accordingly influence local and/or global magnetic properties of the structures (e.g., core/stator) of the EM system within which the OHP is embedded. According to some embodiments, the working fluid may be chosen for a desired freezing point or critical point, as well as compatibility with structure/coatings it may be exposed to. The working fluid can also be chosen based on its heat capacity or density.

According to some nonlimiting exemplary embodiments of the present disclosure, the working fluid may include any one or more of: glycerin, heptane, dowtherm G (a mixture of di- and tri-aryl compounds), mercury, sulphur, cesium, NaK (sodium-potassium alloy), sodium, potassium or water. Working fluids may further include, for example, ammonia, acetone, alcohol family or known refrigerants (R134a, R22, etc.). According to an exemplary embodiment of the present disclosure, the working fluid may be sealed within the OHP via, for example, a pinch, crimp, or valve and cap arranged at least at one end of the continuous serpentine channel.

The following figures (FIGS. 5-8) represent exemplary embodiments according to the present disclosure of channel segments embedded in structures (e.g., 112, 114, 122) of an electric motor (EM) system to provide functionalities of a heat exchanger as described above with reference to FIGS. 2-4. It should be noted that such exemplary embodiments may not be considered as limiting the scope of the present application as it would be impossible to represent and/or describe any possible variation of channel segments and/or a corresponding sequence that make a channel path for use as a heat pipe (e.g., OHP).

FIG. 5A shows a (simplified) isometric view of a base structure (112) of an electric motor (EM) system with integrated heat exchanger according to an embodiment of the present disclosure, the base structure (112) comprising channel segments (212$a$1, 212$a$2, 212$b$1, 212$b$2) to provide functionality of an embedded oscillating heat pipe (OHP, 212). Further details of the channel segments (212$a$1, 212$a$2, 212$b$1, 212$b$2) are shown in the cutout view of FIG. 5B. As shown in FIGS. 5A-5B, the channel segments (212$a$1, 212$a$2, 212$b$1, 212$b$2) may be interconnected and contiguous such as to form a continuous serpentine (meandering) channel that alternates between the base/bottom plate (112$a$) and the axial extension (112$b$) of the base structure (112). According to an embodiment of the present disclosure, the base structure (112) may be a monolithic structure.

As shown in FIGS. 5A-5B, the channel segments (212$a$1, 212$a$2, 212$b$1, 212$b$2) may include channel segments (212$a$1, 212$a$2) embedded within the base/bottom plate (112$a$, e.g., circular/round shape) of the base structure (112), and channel segments (212$b$1, 212$b$2) embedded within the longitudinal extension (112$b$, e.g., cylindrical shape) of the base structure (112). Furthermore, the channel segments may include axial segments (e.g., 212$b$2), radial segments (e.g., 212$a$2), outer circumferential segments (e.g., 212$b$1), and inner circumferential segments (e.g., 212$a$1). The exemplary nonlimiting channel path provided by the continuous serpentine channel of FIGS. 5A-5B may include a pattern/sequence provided by: connection of an inner circumferential segment (212$a$1), that may be adjacent to a source of heat, to a radial segment (212$a$2) for transport of the heat away from the source towards the outer circumference of the base plate (112$b$); connection of the radial segment (212$a$2) to an axial segment (212$b$2) for transport of the heat into the longitudinal extension (112$b$) and towards an overlap region (e.g., $R_{OL}$ of FIG. 2A) for further transport through, for example, sections of a heat exchanger; and connection of the axial segment (212$b$) to an outer circumferential segment (212$b$1) to continue the channel path.

FIG. 6A shows a (simplified) isometric view of a top structure (114) of an electric motor (EM) system with integrated heat exchanger according to an embodiment of the present disclosure, the top structure (114) comprising channel segments (214$a$1, 214$a$2, 214$b$1, 214$b$2) to provide functionality of an embedded oscillating heat pipe (OHP, 214). Further details of the channel segments (214$a$1, 214$a$2, 214$b$1, 214$b$2) are shown in the cutout view of FIG. 6B. As shown in FIGS. 6A-6B, the channel segments (214$a$1, 214$a$2, 214$b$1, 214$b$2) may be interconnected and contiguous such as to form a continuous serpentine (meandering) channel that alternates between the top plate (114a) and the axial extension (114b) of the top structure (112). According to an embodiment of the present disclosure, the top structure (114) may be a monolithic structure.

As shown in FIGS. 6A-6B, the channel segments (214a1, 214a2, 214b1, 214b2) may include channel segments (214a1, 214a2) embedded within the top plate (114a, e.g., circular/round shape) of the top structure (114), and channel segments (214b1, 214b2) embedded within the longitudinal extension (114b, e.g., cylindrical shape) of the top structure (114). Furthermore, the channel segments may include axial segments (e.g., 214b2), radial segments (e.g., 214a2), outer circumferential segments (e.g., 214b1), and inner circumferential segments (e.g., 214a1). The exemplary nonlimiting channel path provided by the continuous serpentine channel of FIGS. 6A-6B may include a pattern/sequence provided by: connection of an axial segment (214b2) to a radial segment (214a2) for transport of the heat from a heat region (e.g., $R_{OL}$ of FIG. 2A) of the longitudinal extension (114b) towards a heat rejection region (e.g., top plate 114a); connection of the radial segment (214a2) to an inner circumferential segment (214a1) for further transport to and/or maintaining of the heat within the heat rejection unit (e.g., including interaction with a secondary thermal system); and a return path towards the heat region via a connection of the inner circumferential segment (214a1) to another the radial segment (214a2), followed by another axial segment (214b2). As shown in FIGS. 6A-6B, two such patterns may be connected/coupled through an outer circumferential segment (e.g., 214b1).

Figures 7A, 7B:
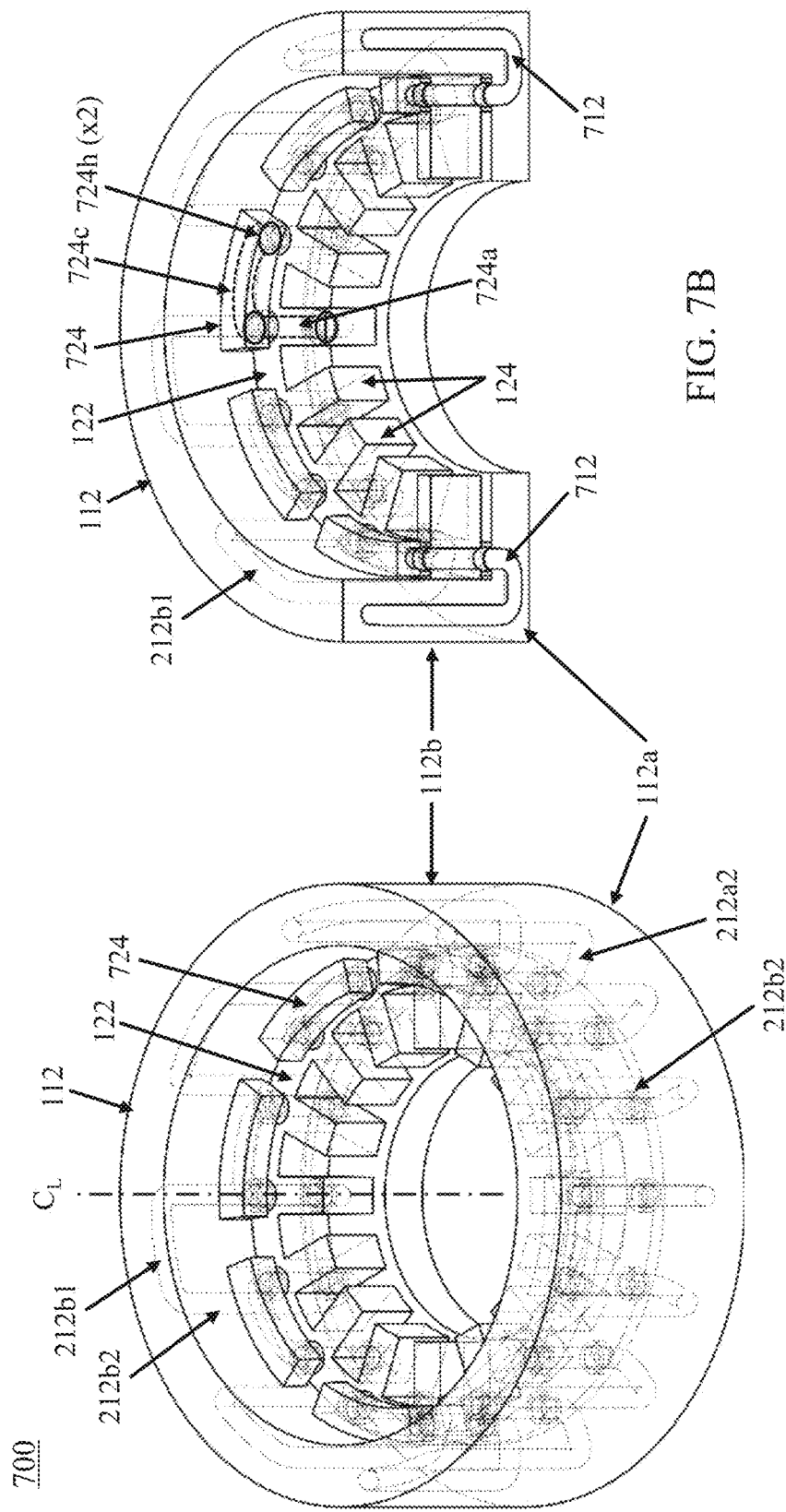
FIG. 7A shows a (simplified) isometric view of an assembly comprising a base structure and a core of a stator of an electric motor (EM) system according to an embodiment of the present disclosure with an embedded oscillating heat pipe (OHP) comprising channel segments.
FIG. 7B shows a cutout of the isometric view of FIG. 7A exhibiting details of the channel segments.

FIG. 7A shows a (simplified) isometric view of an assembly (700) comprising a base structure (112) and a core (122) of a stator (e.g., 120 of FIG. 4A) of an electric motor (EM) system (e.g., 400a of FIG. 4A) according to an embodiment of the present disclosure, the assembly (700) comprising channel segments (212a2, 212b1, 212b2, 712, 724a, 724h) to provide functionality of an embedded oscillating heat pipe (OHP, e.g., 212 of FIG. 4A). Further details of the assembly (700), including of the channel segments (212a2, 212b1, 212b2, 712, 724a, 724a) are shown in the cutout view of FIG. 7B and in the top view of FIG. 7C. As shown in FIGS. 7A-7C, the channel segments (212a2, 212b1, 212b2, 712, 724a, 724h) may be interconnected and contiguous such as to form a continuous serpentine (meandering) channel that alternates between the base structure (112) and the core (122) of the stator (e.g., 120 of FIG. 4A). In other words, each of the base structure (112) and core (122) may include disjoint channel segments and/or disjoint channel paths (a continuous path comprising a plurality of contiguous channel segments) that combine in the assembly (700) to form the continuous serpentine channel. According to an embodiment of the present disclosure, the base structure (112) may be a monolithic structure including embedded channel segments (212a2, 212b1, 212b2).

Figure 7C:
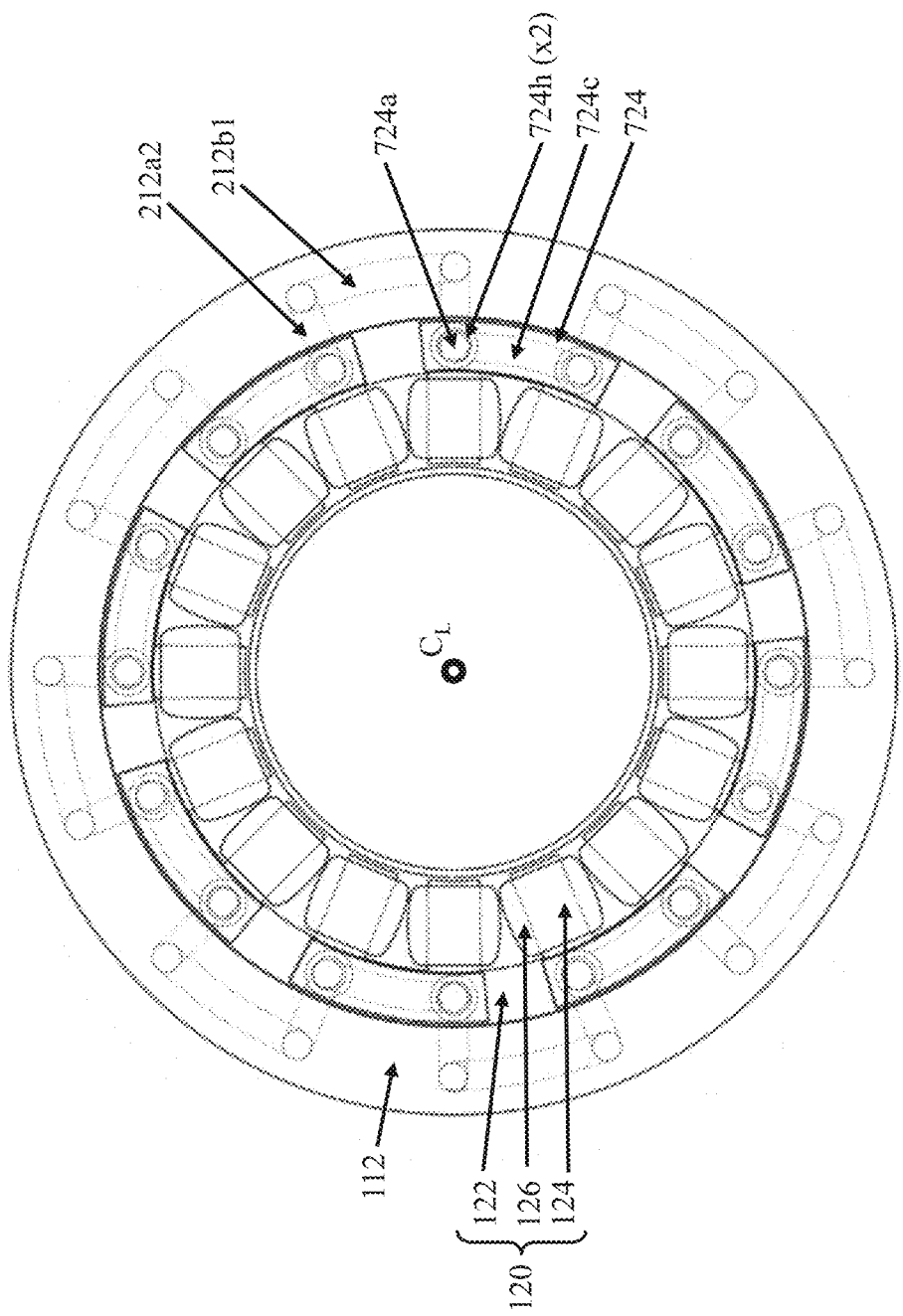
FIG. 7C shows a top view of the assembly shown in FIG. 7A exhibiting further details of the channel segments.

With continued reference to FIGS. 7A-7C, the core (122) may include a traditional structure (e.g., annular, ring-shaped laminate structure with a plurality of pairs of poles 124) into which the channel segments (e.g., 724a) are formed. In the exemplary case shown in FIGS. 7A-7C, such channel segments may include axial channel segments (724a, e.g., FIG. 7B-7C) that traverse the core (122) at locations of the core that are radially aligned with the poles (124), while sufficiently far at an outer circumference of the core (112) that may be clear from the stator windings (e.g., 126 of FIG. 7C). It should be noted that the channel segments (724a) may be likened to one exemplary embodiment of the channel segments (425) described above with reference to, for example, FIG. 4A.

According to an embodiment of the present disclosure, and as shown in FIGS. 7A-7C, the axial channel segments (e.g., 724a) of the core (122) may be axially aligned with respective (ends of) radial channel segments (e.g., 212a2) formed in the base/bottom plate (112a) of the base structure (112) so to form, in combination, a continuous (but not complete) channel path that includes (in sequence) the segments (724a, 212a2, 212b2, 212b1, 212b2, 724a). In other words, upon assembly of the core (122) onto the base structure (112), any one of the axial channel segments (724a) may be in communication with one of the two adjacent/flanked axial channel segments (724a) but not the other. It follows that according to an embodiment of the present disclosure, a bridging structure (724, e.g., sealing clamp) may be coupled between pairs of the axial channel segments (724a) to close/complete the continuous serpentine channel (e.g., 212 of FIG. 4A) for provision of the functionality of the OHP. As shown in the FIGS. 7A-7C, the bridging structure (724) may include an embedded channel segment (724c) with two openings (724h) that may align with the axial channel segments (724a). Furthermore, sealing of the OHP (e.g., channel filled with working fluid) may be provided with (e.g., two) terminating structures (e.g., 712 of FIG. 7B) that may be coupled to corresponding bridging structures (724a). It should be noted that the configuration shown in FIGS. 7A-7C may not be considered as limiting the scope of the present application, as other configurations that may use bridging elements (e.g., 724) to complete a continuous serpentine channel across two or more structures (e.g., 112, 122) of an electric motor (EM) system may be envisioned. It should be noted that the channel segments (724a, 724c) may be likened to one exemplary embodiment of the channel segments (425) described above with reference to, for example, FIG. 4A.

Figure 8A:
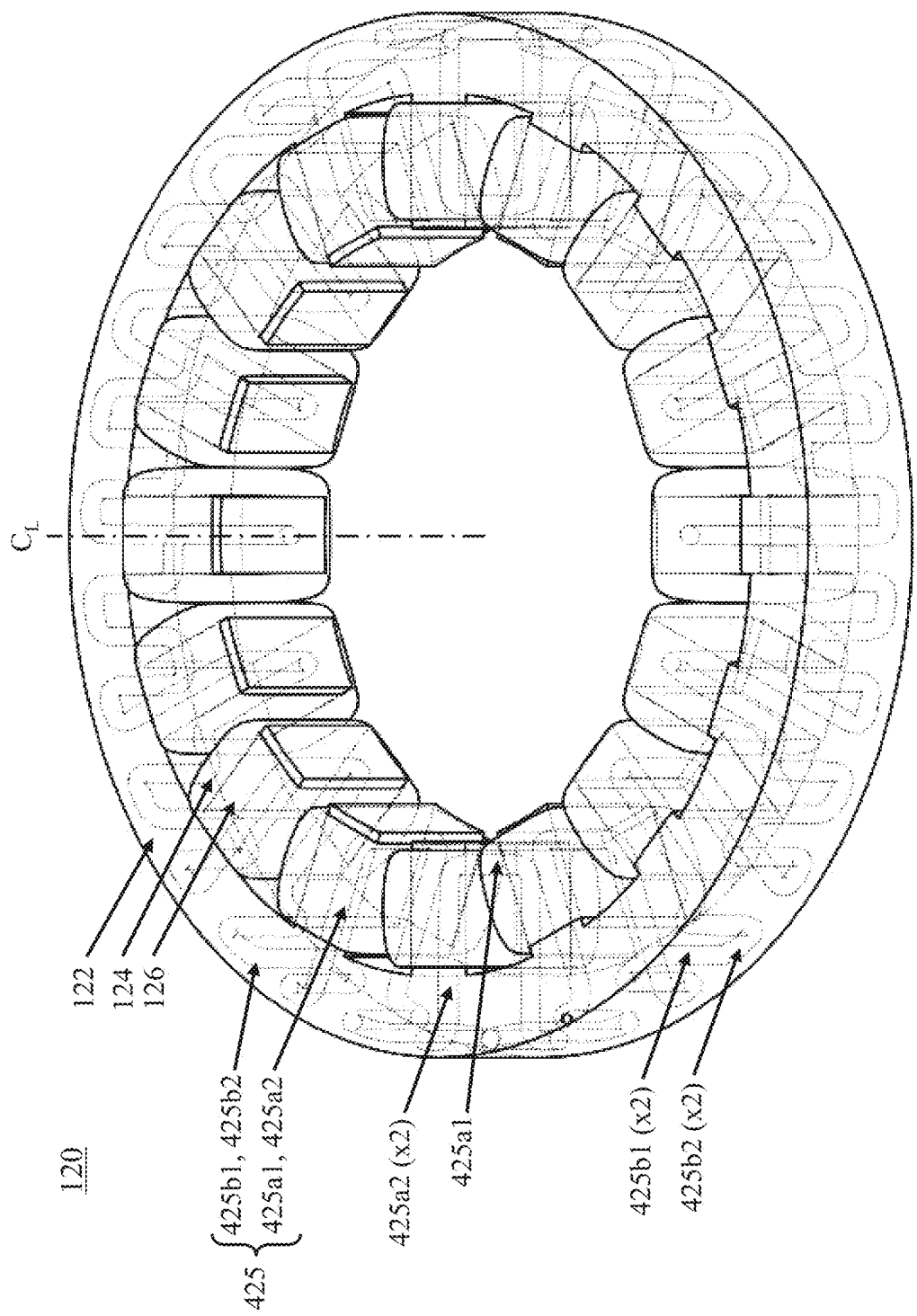
FIG. 8A shows a (simplified top) isometric view of a stator of an electric motor (EM) system according to an embodiment of the present disclosure with an embedded oscillating heat pipe (OHP) comprising channel segments.
Figure 8B:
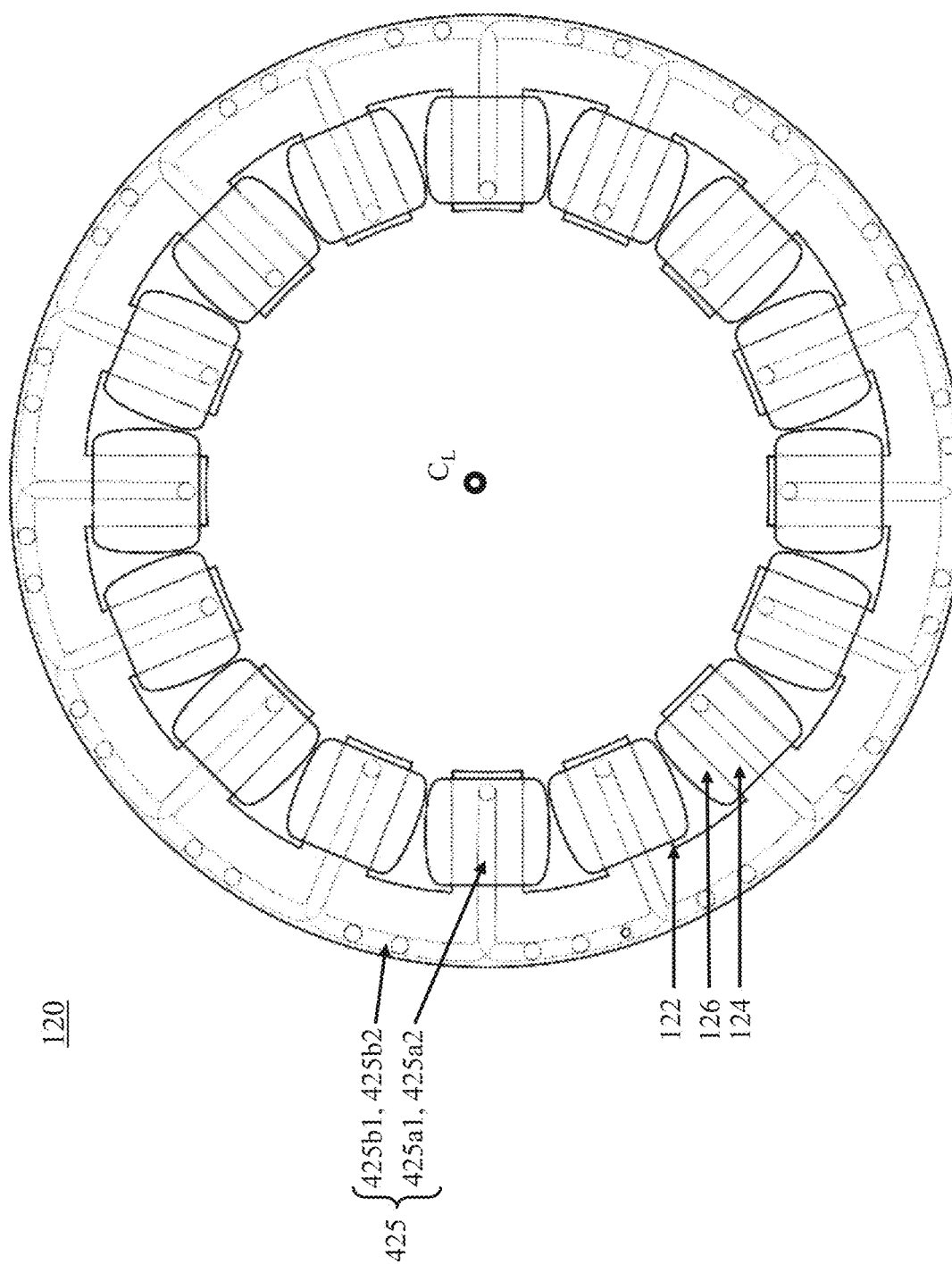
FIG. 8B shows a top view of the stator shown in FIG. 8A exhibiting details of the channel segments.

FIG. 8A shows a (simplified top) isometric view of a stator (120) of an electric motor (EM) system with integrated heat exchanger according to an embodiment of the present disclosure, the core (122) of the stator (120) comprising channel segments (425a1, 425a2, 425b1, 425b2) to provide functionality of an embedded oscillating heat pipe (OHP, e.g., 425 of FIGS. 4B-4C). Further details of the channel segments (425a1, 425a2, 425b1, 425b2) are shown in the top view of FIG. 8B. As shown in FIGS. 8A-8B, the channel segments (425a1, 425a2, 425b1, 425b2) may be interconnected and contiguous such as to form a continuous serpentine (meandering) channel (e.g., 425) that alternates between the outer circumference (e.g., outer wall, periphery region in close proximity of the housing of the EM system) of the core (122) and the inner circumference of the core (122) provided/defined by the poles (124). According to an embodiment of the present disclosure, the core (122) of the stator (120) may be a monolithic structure.

As shown in FIGS. 8A-8B, the channel segments (425a1, 425a2, 425b1, 425b2) may include channel segments (425a1, 425a2) that extend from the outer circumference of the core (122) into the poles (124) of the core (122), and channel segments (425b1, 425b2) that follow the outer circumference of the core (122) and away from the poles (124). Furthermore, the channel segments may include axial segments (e.g., 425a1, 425b1), radial segments (e.g., 425a2), and outer circumferential segments (e.g., 425b2). For example, the channel path provided by the continuous serpentine channel of FIGS. 8A-8B may include a pattern/sequence provided by: connection of two extremities (e.g., ends) of an axial segment (425a1) to respective radial segments (425a2) for transport of the heat away from a pole (124, e.g., source of heat) and towards the outer circumference of the core (122) where the heat may be coupled to an adjacent structure (e.g., base structure 112 of FIGS. 4B-4C); and connection of each of the respective radial segments (425a2) to a respective outer circumferential segment (425b2) followed by an axial segment (425b1) for connection/communication to each of the (two) flanking poles (124).

As described above, teachings according to the present disclosure may use 3D printing to form/embed/integrate features of a heat exchange system (e.g., thermal management system) within structures of an EM system, such features including (internal) channel segments that join to form a continuous serpentine (meandering) channel that may extend through one or more of the structures of the EM system. Various process steps involved in the making of the EM system with integrated heat exchanger according to the present disclosure may include: 1) create nominal design; 2) design channel paths for optimizing heat transport, including serpentine path which sufficiently high number of alternations between hot and cold regions; 3) model influence of removal of material from the structures of the EM system for working fluid lines/channels and revise line geometry to minimize impact of the removal of material and/or addition of the working fluid (may include topology optimization and/or multi-physics simulation, etc.); 4) convert solid model to surface mesh and import to build preparation software; 5) print on metal printer; 6) removal of powder from tapped channels; 7) Perform machining operations; 8) Perform any required heat treat to optimize mechanical/electrical/magnetic properties; 9) Vacuum gases out of the channels in part, then backfill with desired mass/pressure of chosen working fluid for OHPs; 10) Seal filling tube off with e.g., pinch, crimp, or valve & cap to permanently seal; and 11) Integrate part into the EM system.

Figure 9:
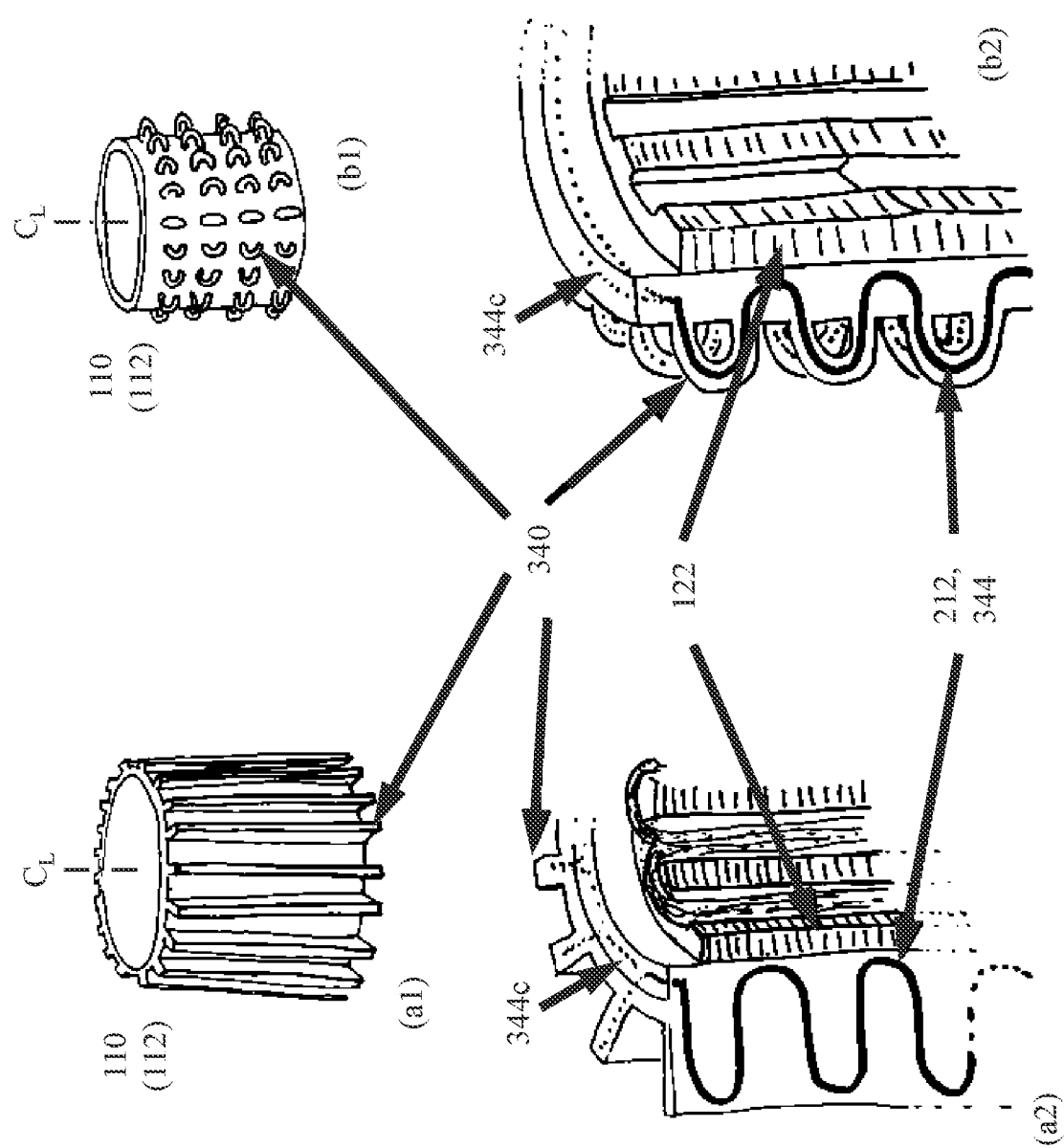
FIG. 9 shows two embodiments of a housing with surface area increasing features with embedded oscillating heat pipes according to the present disclosure.

FIG. 9 shows two exemplary embodiments of a housing (110) with surface area increasing features (340, protruding bodies) with embedded oscillating heat pipes (OHPs) according to the present disclosure. In particular, FIG. 9(a1) shows a (cylindrical) housing (110, 112) with an embedded OHP (212) that includes longitudinal fins (340, protruding bodies) with embedded channel segments (344) of the OHP (212) as shown in the corresponding cutout of FIG. 9(a2). On the other hand, FIG. 9(b1) shows a (cylindrical) housing (110, 112) with an embedded OHP (212) that includes loop-shaped protrusions (340, protruding bodies) with embedded channel segments (344) as shown in the corresponding cutout of FIG. 9(b2). It is noted that the housing (110) shown in FIG. 9 may be used in any of the configurations of the EM system according to the present disclosure described above, including, for example, the EM systems described with reference to FIGS. 4A-4F.

As shown in FIG. 9, according to a nonlimiting embodiment of the present disclosure, the embedded channel segments (344) of the OHP (212) may join through circumferential channel segments (344c) that run along a top circumference (and/or a bottom circumference (not shown in FIG. 9) of the housing (110) to provide a full longitudinal/axial and circumferential coverage of the OHP (212) within a volume of the housing (110). Furthermore, as shown in FIG. 9, according to a nonlimiting embodiment of the present disclosure, the embedded channel segments (344) may follow a meandering path between a region of the housing (110, e.g., inner circumference region/surface of the housing) that is near the stator (e.g., stator core 122, source of heat) and a region of the housing (110, e.g., outer edge of the protrusions, outer circumference region/surface of the housing) that is near an outer edge of the protrusions (340, e.g., region of a heat sink). A shown in FIG. 9, such meandering path of the channel segments (344) may provide coverage of the OHP (212) along a longitudinal extension of the housing (110) at a plurality of radial directions/positions of the housing (110). It should be noted that while the (full) longitudinal coverage according to FIG. 9(a2) may be provided by each of the fin-shaped features/protrusions, in the case of FIG. 9(b2), the longitudinal coverage may be provided by an array of the loop-shaped features/protrusions that are longitudinally aligned (e.g., longitudinal array, at substantially same radial/angular position).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. An electric motor (EM) system with integrated heat exchanger, comprising:
a housing comprising:
a cylindrical shape with a longitudinal extension according to an axial direction;
surface area increasing features that protrude outward of the cylindrical shape of the housing; and
a first group of channel segments for provision of an embedded housing oscillating heat pipe (OHP), the first group of channel segments extending axially and circumferentially within the cylindrical shape of the housing and into the surface area increasing features; and
a core structure of a stator coupled along a region of the longitudinal extension of the housing,
wherein
the core structure comprises a second group of channel segments for provision of an embedded core OHP, the first group of channel segments form a first continuous channel inside of the housing for provision of the housing OHP, the second group of channel segments form a second continuous channel inside of the core structure for provision of the core OHP, and the housing with the first group of channel segments and the core structure with the second group of channel segments form one monolithic structure.

2. The electric motor (EM) system with integrated heat exchanger of claim 1, wherein:

the first continuous channel comprises a path that alternates between an inner circumference of the housing and an outer circumference of the housing.

3. The electric motor (EM) system with integrated heat exchanger of claim 2, wherein:

alternations between the inner circumference of the housing and the outer circumference of the housing are according to a periodic pattern.

4. The electric motor (EM) system with integrated heat exchanger of claim 2, wherein:

the surface area increasing features comprise any one or more of: a flat fin-shaped structure; a loop-shaped structure; an arch-shaped structure; or a combination thereof.

5. The electric motor (EM) system with integrated heat exchanger of claim 4, wherein:

the flat fin-shaped structure includes channel segments of the first group of channel segments that form a continuous channel segment of the first continuous channel, and the continuous channel segment includes a plurality of alternations between the inner circumference of the housing and the outer circumference of the housing.

6. The electric motor (EM) system with integrated heat exchanger of claim 4, wherein:

the surface area increasing features comprise a plurality of the loop-shaped structure arranged according to a plurality of longitudinal arrays at different radial positions.

7. The electric motor (EM) system with integrated heat exchanger of claim 4, wherein:

the loop-shaped structure includes channel segments of the first group of channel segments that form a continuous channel segment of the first continuous channel, and the continuous channel segment includes one alternation between the inner circumference of the housing and the outer circumference of the housing.

8. The electric motor (EM) system with integrated heat exchanger of claim 1, wherein:

a material of the monolithic structure is a metal comprising one of: steel; a titanium alloy; an aluminum alloy; or a superalloy.

9. The electric motor (EM) system with integrated heat exchanger of claim 8, wherein:

the superalloy comprises one of: Ni—Cr-based superalloy; Ni-based superalloy; Co-based superalloy; or Cr-based superalloy.

10. The electric motor (EM) system with integrated heat exchanger of claim 1, wherein:

a material of the monolithic structure is a polymer.

11. The electric motor (EM) system with integrated heat exchanger of claim 10, wherein:

the polymer comprises one of: olyamides; polyethylene; acetal; ABS; polycarbonate; polyester; PTFE; PEEK; PEKK; polyamides; polyetherimide; or perfluoroalkoxy.

12. The electric motor (EM) system with integrated heat exchanger of claim 1, wherein:

a material of the monolithic structure is a technical ceramic.

13. The electric motor (EM) system with integrated heat exchanger of claim 12, wherein:

the technical ceramic comprises one of: aluminum oxide; aluminum nitride; boron carbide; magnesium oxide; silicon carbide; silicon nitride; tungsten carbide; zirconia; boron nitride; or aluminum oxynitride.

14. The electric motor (EM) system with integrated heat exchanger of claim 1, further comprising:

a cavity structure coupled to a region of the housing that includes protrusions of the surface area increasing features, the cavity structure configured to contain a flowing fluid coolant in contact with the protrusions.

15. An electric motor (EM) system with integrated heat exchanger, comprising:

a housing comprising:

a cylindrical shape with a longitudinal extension according to an axial direction;

surface area increasing features that protrude outward of the cylindrical shape of the housing; and a first group of channel segments for provision of an embedded housing oscillating heat pipe (OHP), the first group of channel segments extending axially and circumferentially within the cylindrical shape of the housing and into the surface area increasing features; and a core structure of a stator coupled along a region of the longitudinal extension of the housing, wherein the core structure comprises a second group of channel segments for provision of an embedded core OHP, the first group of channel segments comprise respective disjoint channel segments, the second group of channel segments comprise respective disjoint channel segments, and the respective disjoint channel segments of the first and second group of channel segments form a combined continuous channel that extends across the housing and the core structure.

16. The electric motor (EM) system with integrated heat exchanger of claim 15, wherein:

the housing OHP and the core OHP are combined into a common OHP that is provided by the combined continuous channel.

17. The electric motor (EM) system with integrated heat exchanger of claim 15, wherein:

the respective disjoint channel segments of the second group of channel segments includes axial channel segments that traverse the core structure at an outer circumference of the core structure that is clear from poles of the core structure.

18. The electric motor (EM) system with integrated heat exchanger of claim 17, wherein:

the axial channel segments are radially aligned with the poles of the core structure.

19. The electric motor (EM) system with integrated heat exchanger of claim 17, wherein:

two flanked channel segments of the axial channel segments are joined through a channel segment that is embedded in a bridging structure, the bridging structure in contact with a first surface of the core structure.

20. The electric motor (EM) system with integrated heat exchanger of claim 19, wherein:
   the two flanked channel segments are joined to the first group of channel segments through a second surface of the core structure.

21. The electric motor (EM) system with integrated heat exchanger of claim 20, wherein:
   the first group of channel segments include channel segments that extend to the radial locations of the two flanked channel segments through one of:
      a base plate of the housing, or
      a ledge structure of the housing.

22. The electric motor (EM) system with integrated heat exchanger of claim 15, wherein:
   the combined continuous channel comprises a path that alternates between an inner circumference of the housing and an outer circumference of the housing.

23. The electric motor (EM) system with integrated heat exchanger of claim 22, wherein:
   alternations between the inner circumference of the housing and the outer circumference of the housing are according to a periodic pattern.

24. The electric motor (EM) system with integrated heat exchanger of claim 22, wherein:
   the surface area increasing features comprise any one or more of: a flat fin-shaped structure; a loop-shaped structure; an arch-shaped structure; or a combination thereof.

25. The electric motor (EM) system with integrated heat exchanger of claim 15, further comprising:
   a cavity structure coupled to a region of the housing that includes protrusions of the surface area increasing features, the cavity structure configured to contain a flowing fluid coolant in contact with the protrusions.

* * * * *